United States Patent [19]

Hida et al.

[11] Patent Number: 4,881,020

[45] Date of Patent: Nov. 14, 1989

[54] APPARATUS FOR CONTROLLING ATTITUDE OF VEHICLE MOUNTED DEVICE

[75] Inventors: Tsuneo Hida, Toyokawa; Sumio Takizawa; Hakumi Ishii; Hideo Kegasa; Minoru Izawa, all of Toyota, Japan

[73] Assignees: Aisin Seiki Kabushiki Kaisha; Toyota Jidosha Kabushiki Kaisha, both of Aichi, Japan

[21] Appl. No.: 895,631

[22] Filed: Aug. 12, 1986

[30] Foreign Application Priority Data

Aug. 13, 1985 [JP] Japan .................................. 60-178442
Aug. 13, 1985 [JP] Japan .................................. 60-178443
Aug. 13, 1985 [JP] Japan .................................. 60-178444
Aug. 13, 1985 [JP] Japan .................................. 60-178445

[51] Int. Cl.$^4$ .................................................. G05G 5/00
[52] U.S. Cl. .................................... 318/626; 318/566; 318/468; 318/739
[58] Field of Search ........ 318/466, 467, 468, 560–569, 318/590–602, 626, 635, 671, 264–266, 739; 265/63, 65 R; 364/425, 706

[56] References Cited

U.S. PATENT DOCUMENTS

| | | | |
|---|---|---|---|
| 3,597,554 | 8/1971 | Siegal | 318/466 |
| 3,626,130 | 12/1971 | Siegal | 318/466 |
| 4,204,255 | 5/1980 | Cremer | 364/425 |
| 4,401,928 | 8/1983 | Kamijo et al. | 318/466 |
| 4,404,632 | 9/1983 | Harada et al. | 318/466 |
| 4,451,887 | 5/1984 | Harada et al. | 364/425 |
| 4,463,426 | 7/1984 | Caddick et al. | 318/466 |
| 4,503,504 | 3/1985 | Suzumura et al. | 318/466 |
| 4,540,252 | 9/1985 | Hayashi et al. | 318/466 |
| 4,638,982 | 1/1987 | Misher et al. | 318/467 |

Primary Examiner—William M. Shoop, Jr.
Assistant Examiner—David Martin
Attorney, Agent, or Firm—Sughrue, Mion, Zinn, Macpeak & Seas

[57] ABSTRACT

An imaginary limit position is determined on the basis of a position where an overload condition is detected, and such imaginary limit position is stored. Subsequent to the storage, an extent of movement is limited to that defined by the limit position. An operational mode which re-establishes a stored position is provided. In response to the detection of an overload condition, a motor is reversed to move the attitude back through a small stroke, whereupon the motor is deenergized. When a manual switch is turned on, the motor is driven over an incremental time interval and is then deenergized temporarily. After a given time interval, the motor is again driven. Where a pluarlity of motors are driven simultaneously, the timing of initiating to drive each motor is displaced relative to each other by a small time increment during which a transient current occurs upon initiating the drive.

20 Claims, 34 Drawing Sheets

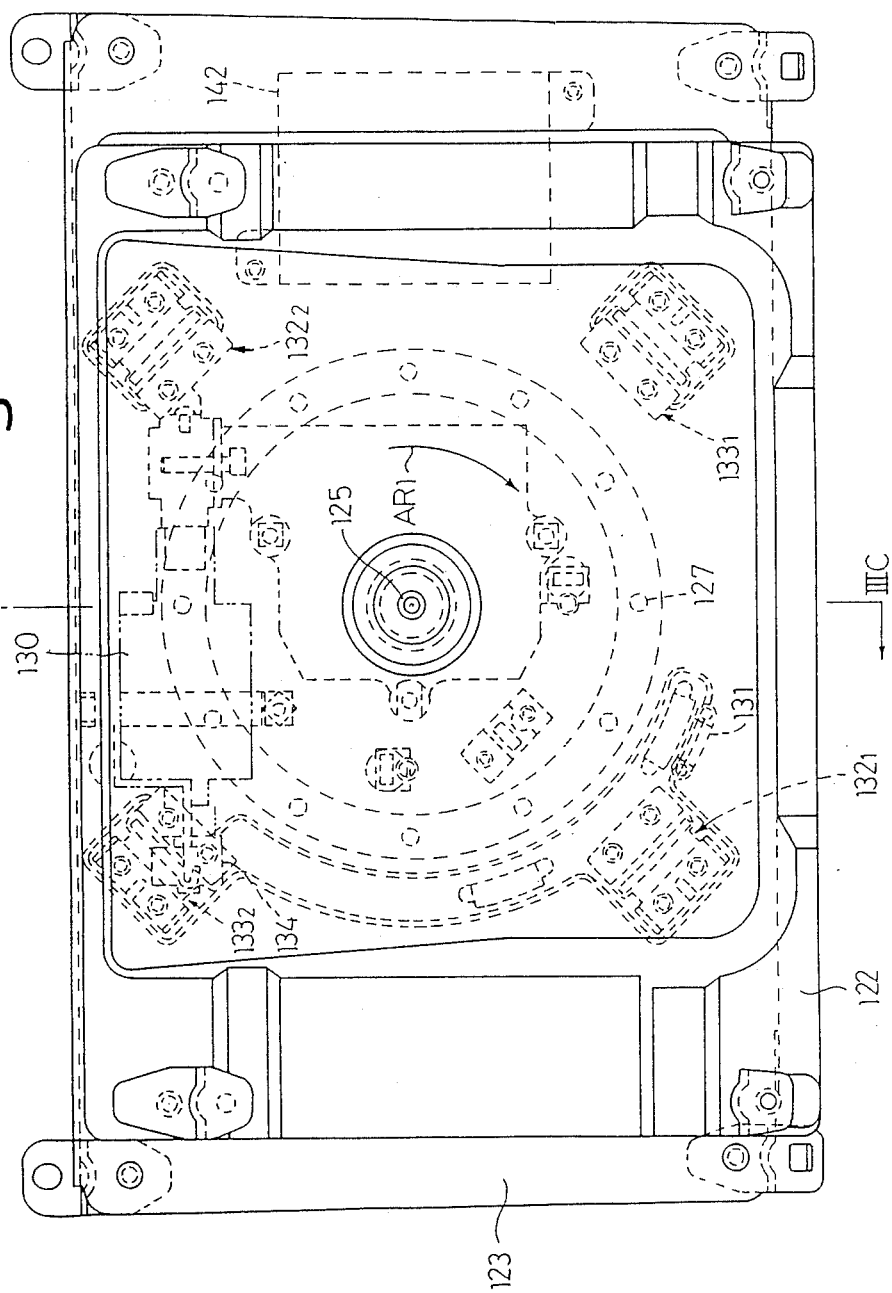

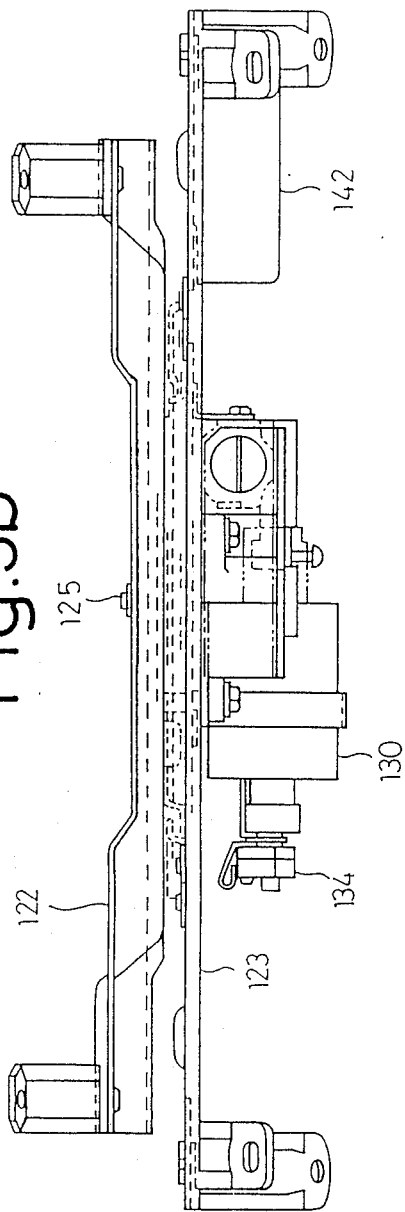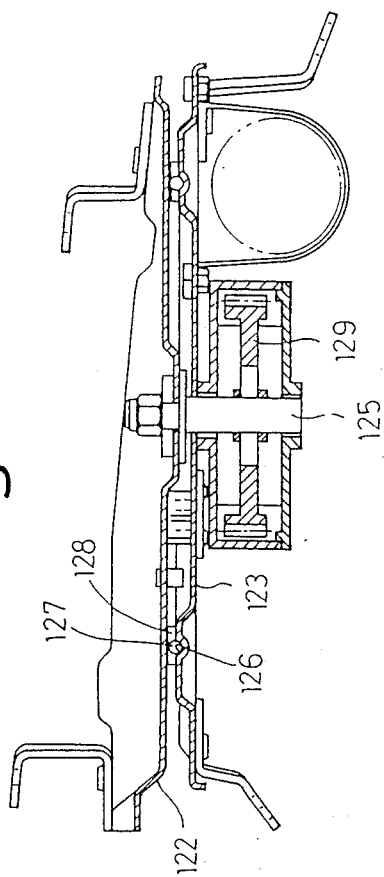

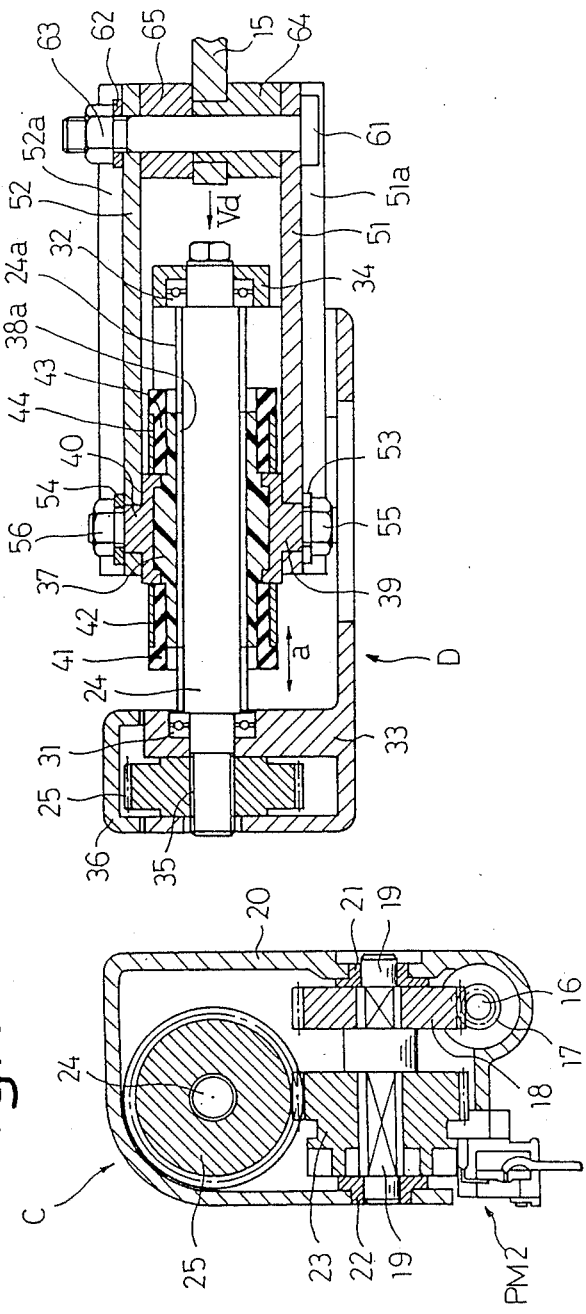

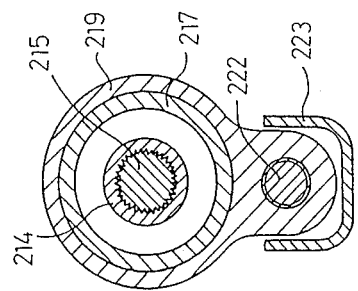
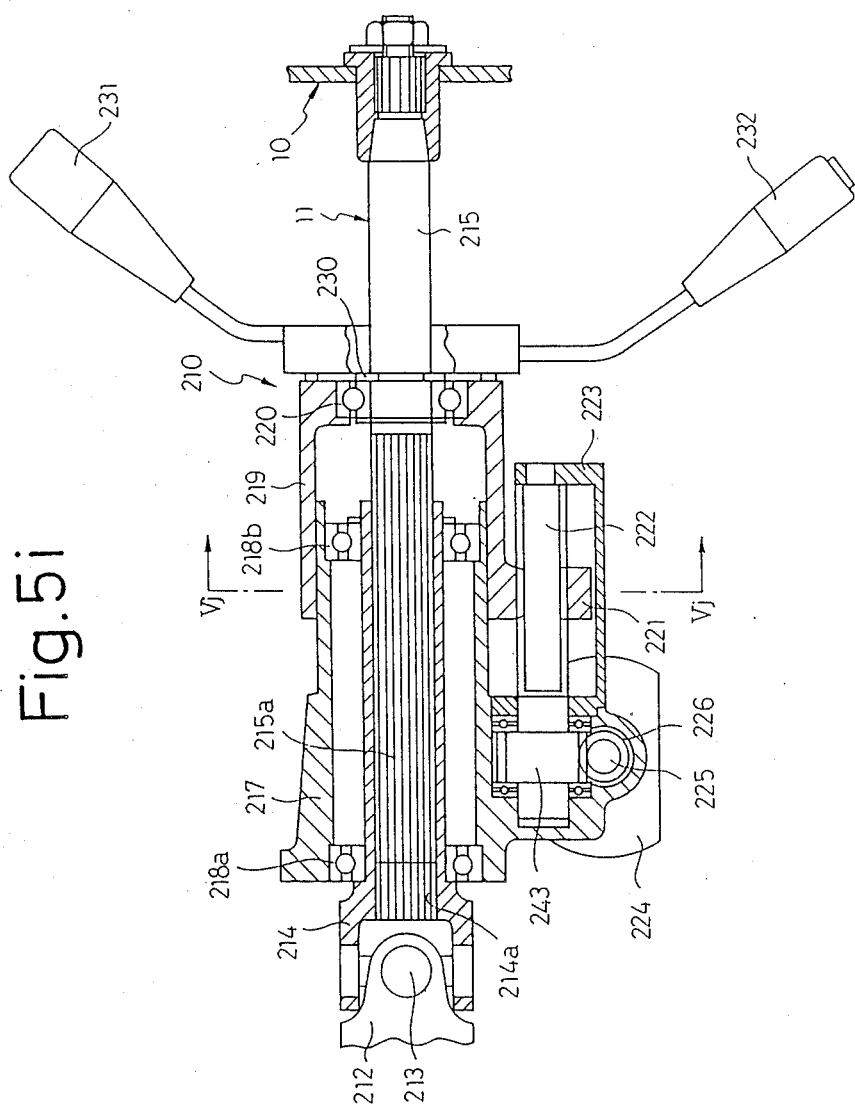

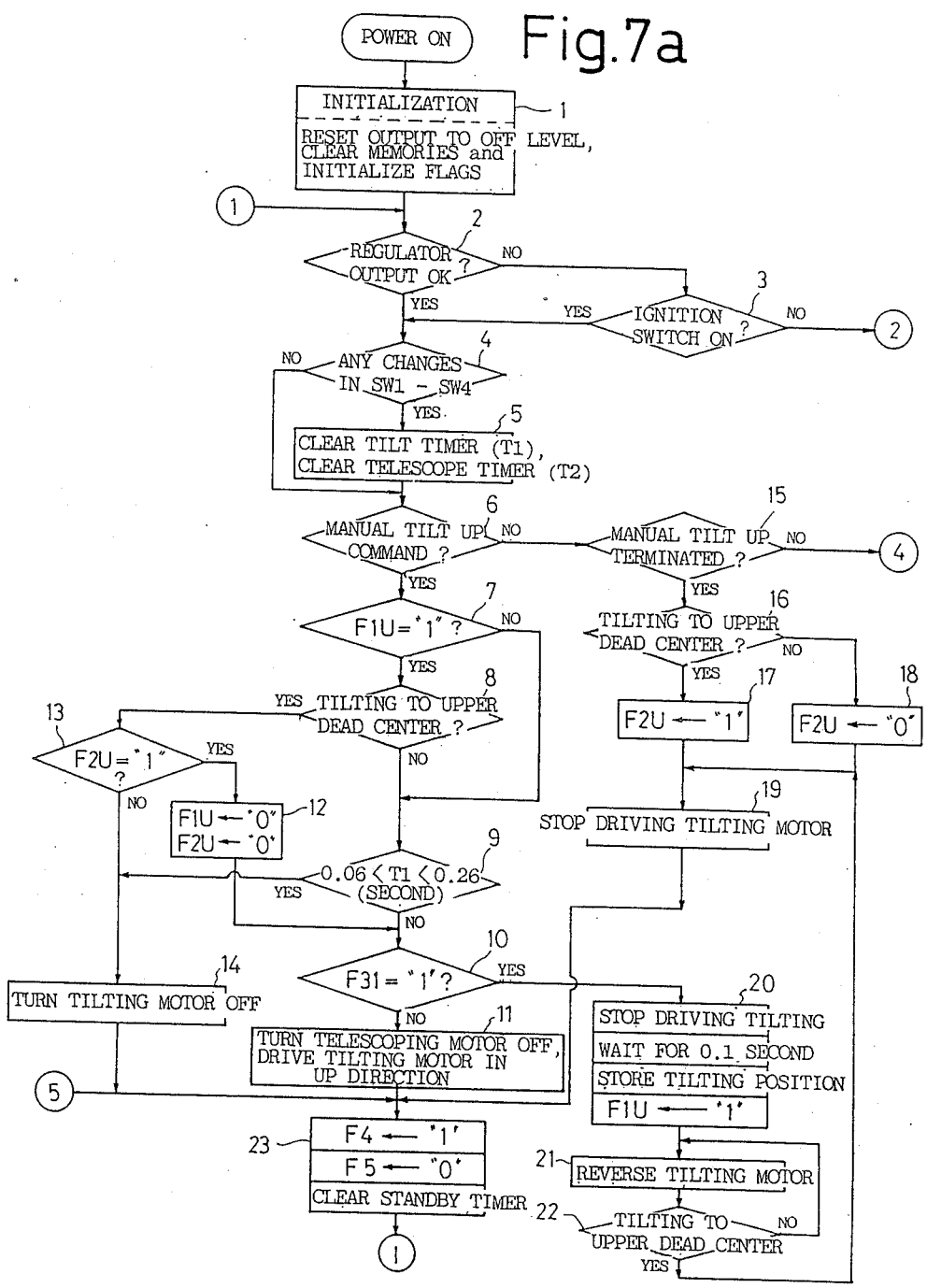

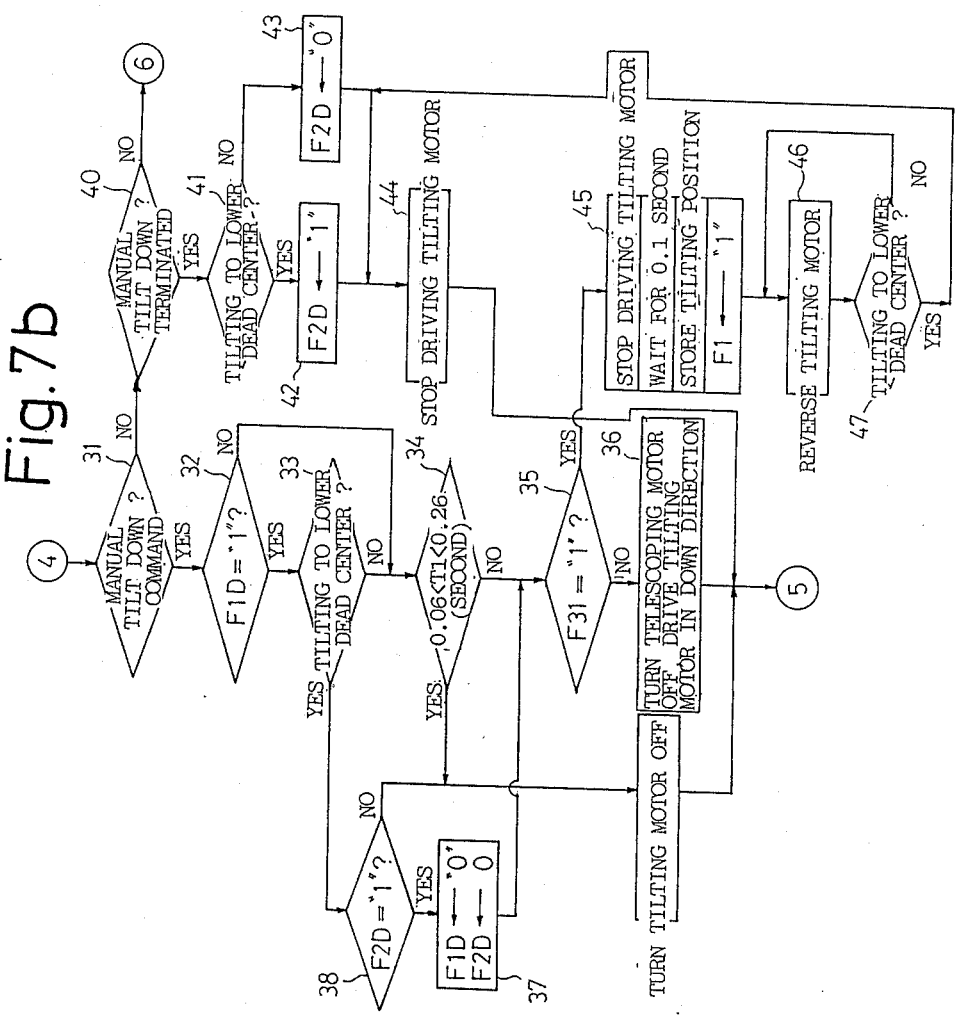

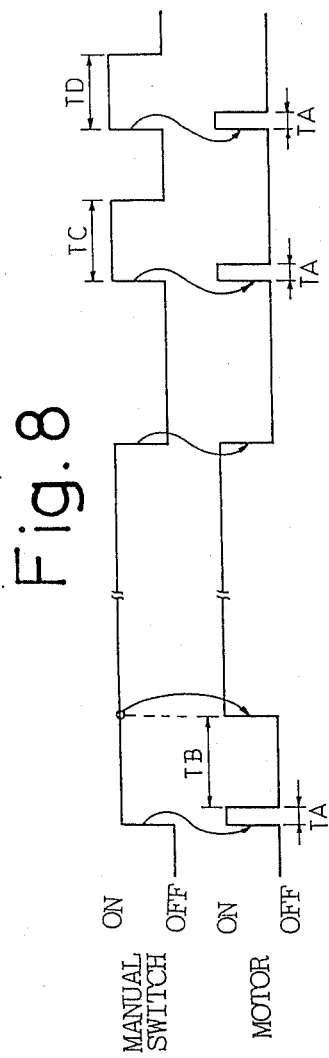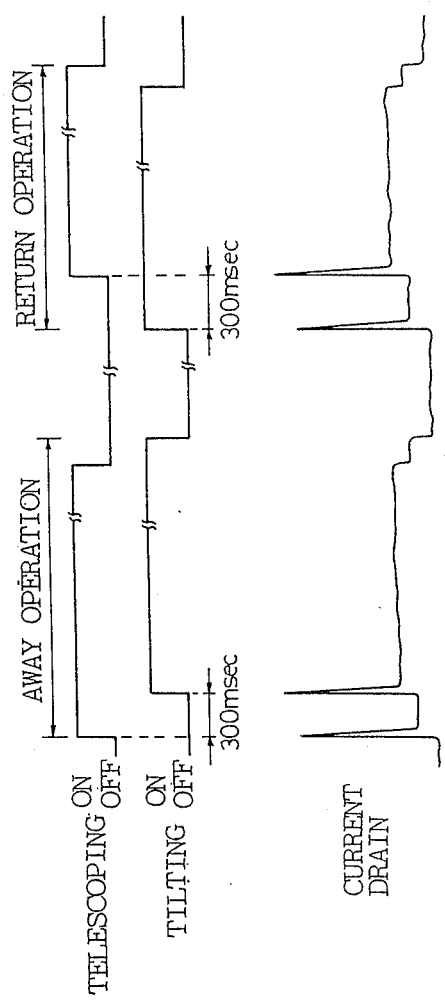

APPARATUS FOR CONTROLLING ATTITUDE OF VEHICLE MOUNTED DEVICE

BACKGROUND OF THE INVENTION

The invention relates to an apparatus for controlling attitude of an electrically driven and positioned, vehicle mounte device or devices such as a seat mechanism, a tilting or telescoping mechanism for a steering assembly, and in particular, to the protection of such an apparatus which is not provided with a detector for detecting a limit position which determines the extent of movement of a movable part.

A road vehicle is generally provided with an arrangement which facilitates every driving operation by a driver, by enabling a free adjustment of the position of a driver's seat, a steering wheel or the like. These elements are normally adjusted to assume positions used when driving the vehicle. It will be appreciated that the seat or the like is positioned to leave only only the space required for the driver to move his hand or foot, so that if the seat or the like is left in such positions, the driver cannot get on or off the vehicle without assuming a stressed attitude because of the steering wheel or seat back which stands in the way for the driver. Accordingly, there is provided an onboard attitude controlling apparatus which brings a steering assembly, including a tilting mechanism and a telescoping mechanism, both of which are electrically driven, to a retracted position when a driver gets on or off the vehicle and which brings the assembly back to its operating position during the time the vehicle is being driven, or an onboard seat rotation controlling apparatus which directs a seat toward a boarding opening by providing an electric drive which rotates the seat.

In an electric drive mechanism, in particular, one in which an on/off drive is automatically performed, it is necessary that an extent of movement for a mechanism be determined previously so that when the mechanism reaches a limit position, the drive can be stopped at such position. Otherwise, an overload will result when the mechanism reaches the limit position, causing a damage to an electric motor, a wasteful power dissipation, a destruction of the mechanism or the like. Accordingly, it is a usual practice to provide a sensor which detects an imaginary limit position which is located short of a point of abutment by the mechanism, so that the electric motor can be automatically stopped in response to the detection of the limit position. However, when electrically driven devices increase in number, a plurality of expensive sensors must be provided. In addition, locating such sensor represents a time and labor consuming operation. It is understood that a determination as to whether the mechanism has substantially reached its limit position can be made by monitoring a motor current to see if the motor is overloaded, and interrupting the energization of the motor in response to the detection of an overload, thus dispensing with a sensor. However, in this instance, the mechanism will be subject to an increased stress and the motor will experience an excessive current flow each time the mechanism reaches its limit position, thus causing adverse influence upon the mechanism as well as on onboard battery.

Therefore, it is a first object of the invention to provide an apparatus for controlling the attitude of vehicle mounted device which prevents a mechanism from being overloaded upon reaching its limit position while dispensing with a sensor or the like which is normally used to detect the limit position and also dispensing with an adjustment to establish the limit position.

In apparatus for controlling the attitude of an electrically driven device of the kind described, it is a common practice that during a manual mode, the motor is driven as long as a manual switch is turned on, and is stopped in response to the turnoff of the switch. In this manner, the on/off condition of the switch has a one-two-one correspondence to the on/off condition of the motor. With an apparatus of this kind, a fine adjustment to establish a desired attitude can be simply made when the motor is driven at a slow rate, but it takes an increased length of time when the attitude must be changed through an increased stroke. Conversely, if the motor speed is high, the attitude can be brought to a target position rapidly if it has to be changed through an increased stroke, but a quick switch operation is required, presenting a difficulty in achieving an accurate positioning of fine adjustment. In other words, inconveniences are caused if the motor speed is either high or low. When an accurate positioning is required, it is usually the practice to provide a variable speed for the motor. However, this may require an expensive motor or a complex and expensive electronic circuit. In addition, a plurality of command switches must be provided to indicate the drive at one of different speeds.

Accordingly, it is a second object of the invention to provide an apparatus for controlling the attitude of a vehicle mounted device which enables the attitude to be changed through an increased stroke and within a reduced length of time, which facilitates a fine adjustment of the attitude and which can be provided inexpensively without requiring special switches.

It will be seen that a road vehicle includes a plurality of electrically driven apparatus for controlling the attitude, which are associated with a steering assembly, a seat, mirrors or the like. Accordingly, when changing the attitude to a retracted position or returning the attitude to its normal position as the driver gets on or off the vehicle or when adjusting the attitude in accordance with the physical feature of a driver, it is preferred that the attitude of a plurality of the vehicle mounted devices be controlled. Since a drive source or electric motor has a low speed, the control of the attitude requires a relatively long time in apparatus of this kind. Accordingly, when controlling the attitude of a plurality of vehicle mounted devices, the attitude control can be completed within a reduced length of time if the plurality of vehicle mounted devices are driven simultaneously. However, when the plurality of motors are energized simultaneously, there results a current flow of an increased magnitude, which may cause a voltage drop through the wiring, causing the likelihood that the drive of the attitude controlling apparatus itself may cease or a malfunctioning may be caused in other equipment. For this reason, it has been the practice in the prior art that where the attitude of a plurality of vehicle mounted devices must be controlled, the attitude of one device is completed to stop its associated motor before the drive for another device be initiated, resulting in a considerable length of time required in establishing the desired attitude.

Accordingly, it is a third object of the invention to reduce the length of time which is required when establishing the attitude of a plurality of vehicle mounted devices while preventing the occurrence of a malfunctioning of any one of devices being controlled.

SUMMARY OF THE INVENTION

The first object mentioned above is accomplished in accordance with the invention by determining a mechanical limit position in response to the detecting of an overload on a mechanism, storing an imaginary limit position, which is slightly short of, or returned from, the limit position detected, as a reference limit position in a memory in the absence of a previously stoed limit position, and ceasing the drive whenever the imaginary limit position is reached subsequent to the storage. When an overload is detected, the attitude is driven in reverse direction, and the mechanism ceases to be driven after all the stresses applied to the mechanism as a result of the collision are entirely relieved.

In this manner, the imaginary limit position is automatically established with respect to the position where the occurrence of an overload is detected, thus eliminating the need for a special adjustment in order to establish the limit position. It will be seen that the occurrence of an overload as a result of the mechanism being driven until the actual mechanical position is reached is only once when the imaginary limit position is to be established. An overload does not occur normally since the mechanism is stopped at the imaginary limit position where no overload can occur. In addition, when establishing the imaginary limit position, the direction of drive is immediately reversed to terminate the overload condition whenever the mechanical limit position is reached, thus minimizing any damage which may be imparted to the mechanism as a result of such overload.

It is possible that an overload condition may be detected before the actual limit position is reached if a foreign matter is held sandwiched in the course of storage of the imaginary limit position, causing a false position to be stored as a limit position to reduce the extent which is allowed for the movement of the mechanism. Accordingly, in a preferred embodiment of the invention, there is provided a mode to re-establish the limit position in which the attitude is controlled to exceed the previously stored limit position and when an overload condition is detected, a new imaginary limit position which is referenced to the position where the overload is detected is re-stored in a memory.

It is desirable that the storage of the limit position be performed as soon as possible. When such operation is triggered by a manual switch or the like, a failure of a driver to operate the switch may result in a failure to store the limit position.

Accordingly, in a preferred embodiment of the invention, an automatic attitude establishing mode is provided in which the time when a driver gets on and off the vehicle is automatically determined to locate a vehicle mounted device to a retracted position (away operation) which facilitates the driver getting off the vehicle and to locate the device to a normal driving position which it assumed before it is retracted (return operation) immediately after the driver has got on the vehicle. If it is found in this automatic attitude establishing mode that the limit position has not yet been established, the apparatus automatically enters a limit position establishing mode. Specifically, for the away operation, the mechanism is driven beyond the retracted position until it reaches a mechanical first limit position to enable a a first imaginary limit position to be established. For the return operation, the mechanism is driven beyond the normal driving position until it reaches a second mechanical limit position to allow a second imaginary limit position to be established. As a consequence, a limit position is automatically established in response to the opening or closing of a door, the insertion or withdrawal of an engine key, or turning an ignition switch on or off, and hence a driver need not be concerned about establishing the limit positions.

The second object mentioned above is accomplished in accordance with the invention by providing a manual attitude controlling operation in which a motor is turned on and allowed to be energized for a given time interval in response to a switch being turned on, and is then stopped once, followed by a given pause period after which the motor is driven again.

It is generally recognized that it requires a time period on the order of one to several hundreds milliseconds for a man to turn a small switch on and then turns it off. By way of example, when a switch is turned on, the motor may be driven for a time of 0.06 second (first time interval), and is then stopped for the following 0.2 second (second time interval), after which the motor is driven again. When a fine adjustment is desired, the switch may be cycled through an off-on-off condition in a time from 0.06 to 0.26 second. This all that is required to enable the motor to be driven for a given time interval of 0.06 second in response to a single operation (on to off) of the switch if the time required to operate the switch may vary from time to time. Accordingly, the switch may be operated several times while recognizing the attitude in order to bring a vehicle mounted device to a desired attitude in an accurate manner. When the switch continues to be depressed for an increased length of time, the normal operation takes place except that the pause period of 0.2 second is interposed, thus allowing the attitude to be completed within a short length of time if it must be changed through an increased stroke. The length of the first and the second time interval mentioned above can be changed as desired by a driver, and a stroke which the attitude of a vehicle mounted device experiences may be substituted for the first time interval.

The third object mentioned above is accomplished in accordance with the invention by initiating the drive for one of vehicle mounted devices, and initiating the drive for another vehicle mounted device after the transient current of the drive source for the first mentioned device has sufficiently subsided when the attitude of a plurality of vehicle mounted devices must be controlled.

It is recognized that a very high transient current or rush current occurs immediately after an electric motor has begun to be energized. Accordingly, if a plurality of motors begin to be energized simultaneously, a total current drain from a battery will rise to a high value, causing a voltage drop through the wiring and the battery itself. However, the rush current occurs for a brief interval which immediately follows the initiation of the energization, but the current value reduces to a steady-state value in a short time interval which follows. A total current drain from the battery will be within a permissible range if a plurality of motors are driven simultaneously under the steady-state condition. Accordingly, a plurality of drive systems may be driven simultaneously without causing any problem whatsoever, if these drive systems begin to be energized at timings which are displaced from each other by an amount corresponding to the transient period. An actual measurement of the current drain from the battery to determine if it is now during the transient period avoids the need to preset an offset between the initiation of the energization of the several drive systems.

When automatically controlling the tilt angle and the axial position of the steering wheel as a driver gets on and off the vehicle, it is preferred for purpose of freeing from enthralment to create an impression that the steering wheel rapidly moves away from the driver during the away operation. For the return operation, the oppression upon a driver can be alleviated by retarding the movement of the steering wheel toward the driver. However, if the return of the steering wheel to its driving position is retarded, there is produced a time delay before the vehicle can be driven. Accordingly, in a preferred embodiment of the invention, during the away operation, the attitude of the telescoping mechanism is initiated first, followed by the control of the attitude of the tilting mechanism. During the return operation, the attitude of the tilting mechanism is initiated first, followed by the initiation of controlling the attitude of the telescoping mechanism. A movement of the telescoping mechanism toward its retracted position or in a direction to reduce its length enhances the sensation that the steering wheel moves away from the driver as compared with a movement of the tilting mechanism to its retracted position or toward a vertical position. Accordingly, the tilting mechanism is initially controlled to enhance the effect of freeing the driver from the enthralment while the telescoping mechanism is controlled later during the return operation to reduce the oppression upon the driver.

BRIEF DESCRIPTION OF THE DRAWINGS

FIGS. 3a and 3b are a plan view and a front view of a seat rotating mechanism;

FIG. 3c is a cross section taken along the line IIIC—IIIC shown in FIG. 3a;

FIGS. 4b and 4c are sections taken along the lines IVB—IVB and IVC—IVC shown in FIG. 4a;

FIGS. 5b and 5c are sections taken along the lines Vb—Vb and Vc—Vc shown in FIG. 5a;

FIG. 5i is a longitudinal section of a telescopic steering mechanism;

FIG. 5j is a cross section taken along the line Vj—Vj shown in FIG. 5i;

FIGS. 7a, 7b, 7c, 7d, 7e, 7f, 7g, 7h, 7i, 7j, 7k, 7l and 7m are a series of flowcharts indicating the operation by a microcomputer shown in FIG. 6;

FIGS. 8 and 9 are timing charts illustrating the operation of the apparatus shown in FIG. 6;

DESCRIPTION OF PREFERRED EMBODIMENTS

Figure 1:
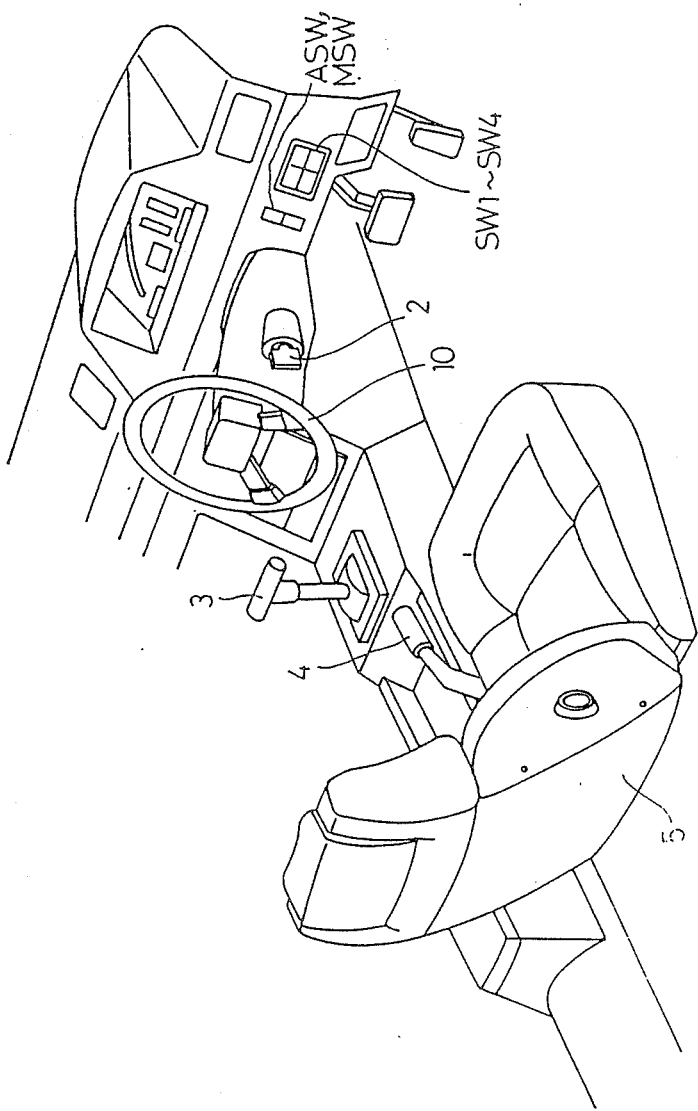
FIGS. 1 and 2 are perspective views illustrating parts around a driver's seat of an automobile on which an attitude controlling apparatus according to an embodiment of the invention is mounted.
Figure 2:
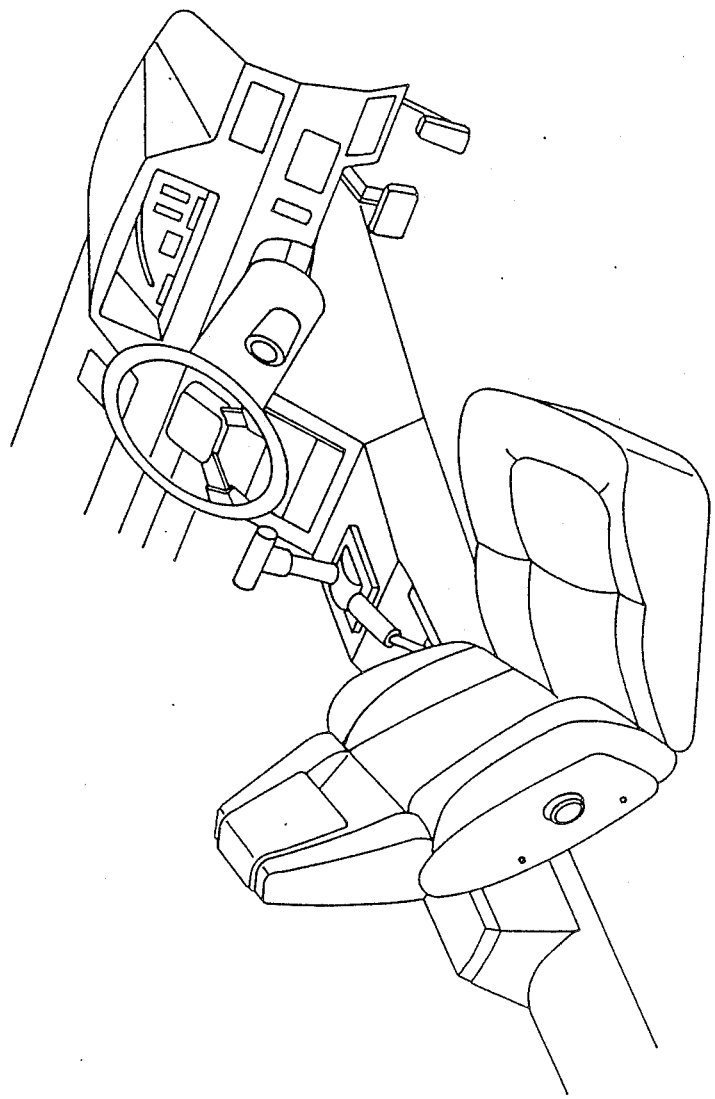

Referring to the drawings, several embodiments of the invention will be described. FIGS. 1 and 2 illustrate parts located around a driver's seat of an automobile on which an apparatus for controlling the attitude of vehicle mounted devices according to an embodiment of the invention is mounted. The apparatus comprises a tilting steering mechanism which adjusts the tilting angle of a steering wheel 10, a telescopic steering mechanism which adjusts the length of a rotary shaft in the steering wheel 10, and a seat rotating mechanism which causes a seat 5 to be rotated about a vertical axis. FIG. 1 shows the parts during the normal driving condition while FIG. 2 shows the parts when a driver gets on or off the automobile. In this embodiment, when establishing an attitude to allow a driver to get on or off the automobile, the steering wheel 10 is brought to a tilt away position which represents an upper limit position for a tilt mechanism while the seat 5 is rotated to a direction which is directed to a door or boarding opening, as illustrated in FIG. 2, and the telescopic steering mechanism is brought to a predetermined position.

Switches SW1 to SW4 represent manual switches which are used to adjust the tilt angle and the length of the rotary shaft of the steering wheel 10 manually. Switch ASW represents an automatic switch which determines whether or not the attitude for getting on and off the vehicle should be automatically performed when the driver gets on or off the vehicle. Switch MSW represents a manual away switch which commands the establishment of the attitude for getting on and off the vehicle under a particular condition. A selection switch SEL which selects a condition for an automatic establishment of the attitude for getting on and off the vehicle is disposed at a location, not shown, which is relatively inaccessible. FIG. 1 also shows an engine key 2, a shift lever for a transmission which is an automatic transmission system in the example shown, and a parking brake lever 4.

The seat 5 is supported by a seat base which is fixedly connected to its underlying rotatable mount 122, which is in turn pivotally mounted on a basement 123, thus allowing the seat 5 to be angularly driven together with the rotatable mount through an angle on the order of 30° from the driving position shown in FIG. 1 to its position shown in FIG. 2 which is utilized to allow a driver to get on or off the vehicle. The rotatable mount 122 and the basement 123 are shown in plan view in FIG. 3a, and in front view in FIG. 3b. A cross section taken along the line IIIC—IIIC shown in FIG. 3a is shown in FIG. 3c. Referring to these Figures, the basement 123 is formed with an opening through which an axle rod 125 extends, with the upper end of the axle rod 125 being fixedly connected to the rotatable mount 122. A plurality of depressions 126, which are configured as part of a sphere, are formed in the basement 123 and located on a circle concentric with the axis of the axle rod 125 and uniformly spaced apart at a given angular interval. Each of the depressions 126 receives a steel ball therein, which is held in place by a ring 128 welded to the basement 123, thus preventing withdrawal of the steel ball 127 from the depressions. It will be seen that the steel balls 127 are carried by the basement 123 and in turn support the rotatable mount 122.

As will be clearly seen in FIG. 3c, a gear 129 is fixedly mounted on the axle rod 125, and is mechanically coupled with a worm, not shown, which is in turn mechanically coupled to the rotary shaft of a d.c. motor 130 (equivalent to M1 shown in FIG. 6) through a bevel gear, not shown. The worm is coupled with a potentiometer PM1 to be described later, which is used to detect the attitude. The rotatable mount 122 rotates clockwise in response to the rotation of the motor 130 in the forward direction, and rotates counter-clockwise in response to the rotation of the motor 130 in the reverse direction. Interposed between the rotatable mount 122 and the basement 123 are braking means $132_1$, $132_2$ which present a frictional resistance to the rotation of the rotatable mount 122 when the latter assumes its driving attitude, and braking means $133_1$, $133_2$ which present a frictional resistance to the rotation of the rotatable mount 122 when the latter assumes the position for getting on and off the vehicle.

Figure 4A:
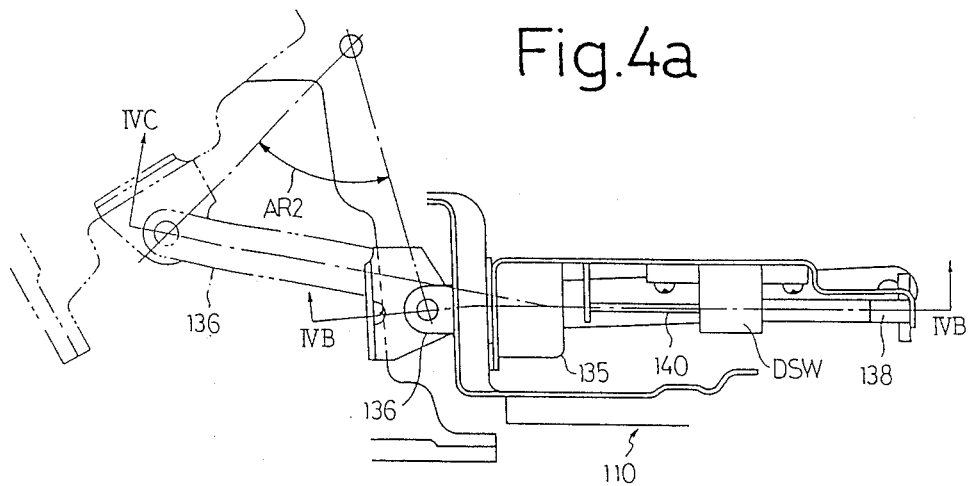
FIG. 4a is a horizontal section of a door check lever mount.

FIG. 4a is a horizontal cross section of a check lever mount associated with a door 110. Referring to FIG. 4a, a door check 135 is fixedly mounted on the door 110, and a check lever 136 having its one end pivotally connected to a car body extends through the door check 135. It is to be understood that the door 110 is pivotally mounted on the car body at its upper and lower hinges so as to be rotatable through a range indicated by a both-ended arrow AR2.

Figure 4B:
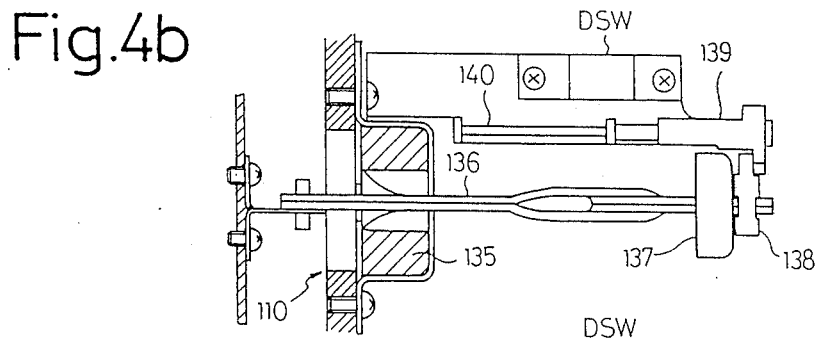
Figure 4C:
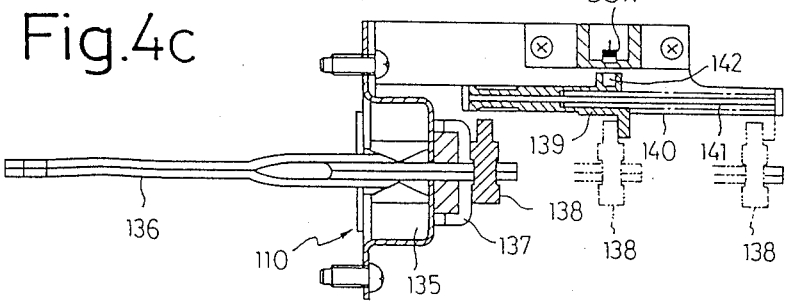

FIG. 4b is a cross section taken along the line IVB—IVB shown in FIG. 4a while FIG. 4c is a cross section taken along the line IVC—IVC shown in FIG. 4a. Referring to these Figures, the other end of the check lever 136, or the end thereof which extends through the door check 135 into a space defined between an outer and an inner cover of the door 110, representing the internal space of the door covers, fixedly carries a stop 137 and a striker 138. An engaging element 139 is slidably mounted on a guide bar 140 and is driven by engagement with the striker 138 through a stroke corresponding to a movement of the door from a half-open position to a fully closed position of the door as the door is moved through its entire stroke from its fully open to its fully closed position. The engaging element 139 is urged by a coiled spring 141 toward the door check 135. As shown in FIG. 4c, at the half-open position of the door, the striker 138 bears against the engaging element 139, whereupon the engaging element 139 abuts against an arm or stop which supports the guide bar 140 and is prevented from moving further toward the door check 135. A magnet 142 is fixedly mounted on the engaging element 139, and when the engaging element 139 assumes its stop position located close to the door check 135 shown in FIG. 4c, the magnet 142 is located opposite to a reed switch DSW (door switch). During a stroke of the door 110 from its fully open to its half-open position, the permanent magnet 142 is located opposite to the reed switch DSW as shown in FIG. 4c, whereby the reed switch DSW is subject to a magnetic field from the magnet 142 to deliver a door open signal of ground level. When the door 110 moves beyond the half-open position or when its opening is less than one-half, the magnet 142 moves to the left as viewed in FIG. 4c, whereupon the reed switch DSW delivers a door closed signal of a high level.

Figure 5A:
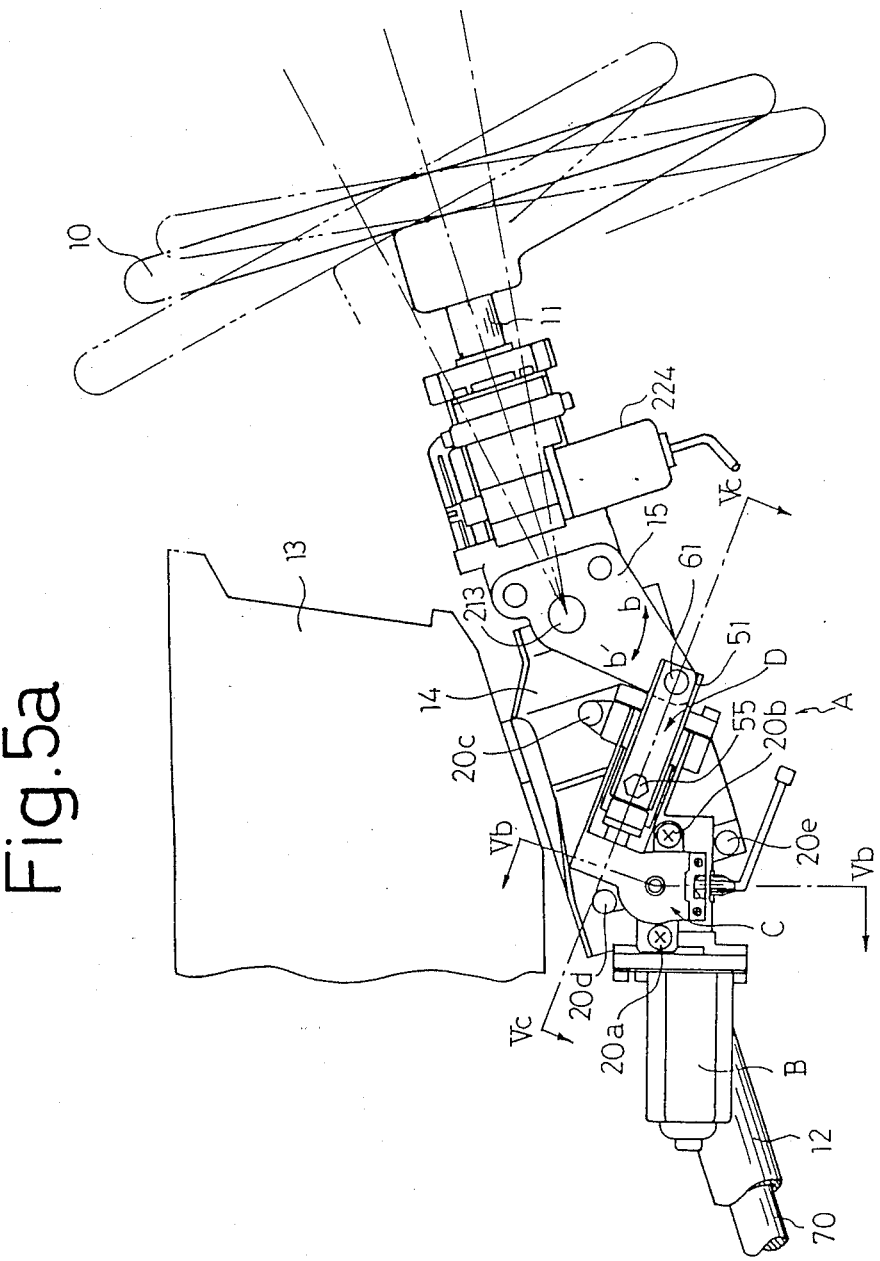
FIG. 5a is a schematic view of a steering assembly, as viewed from its left side.
Figure 5F:
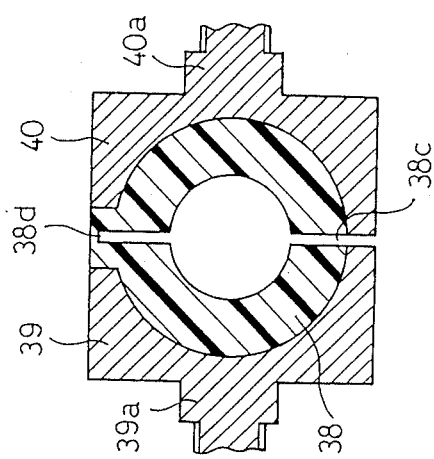
FIGS. 5e and 5f are sections taken along the lines Ve—Ve and Vf—Vf and shown in FIG. 5d.
Figure 5D:
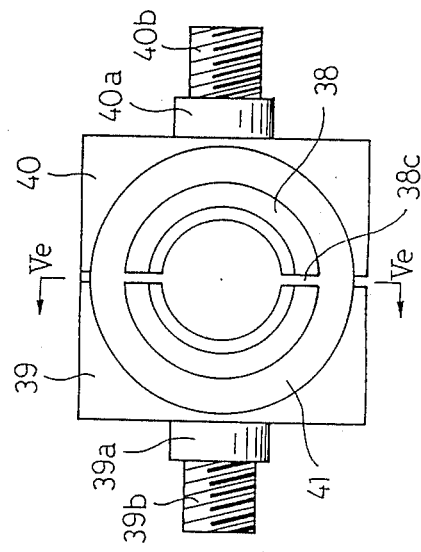
FIG. 5d is an enlarged front view as viewed in a direction Vd shown in FIG. 5c.
Figure 5E:
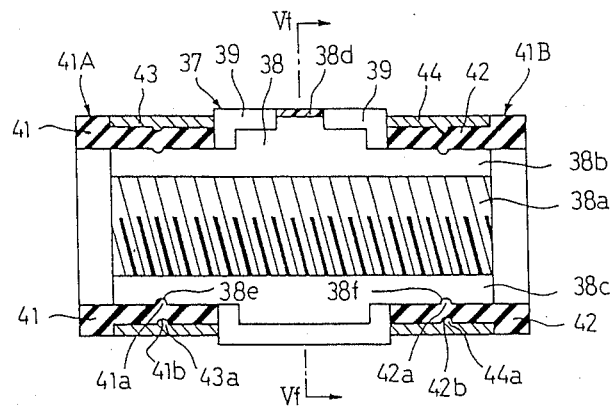
Figure 5G:
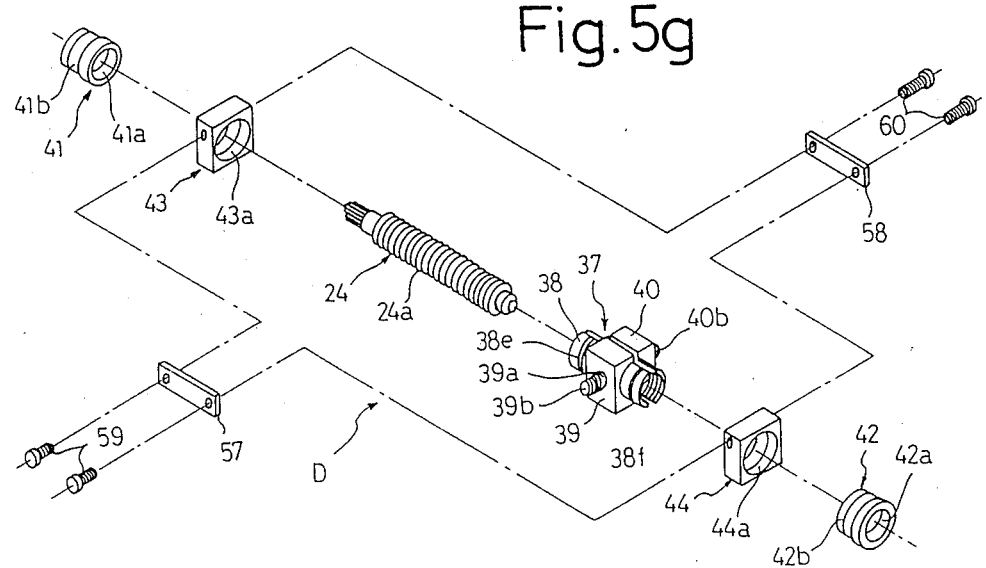
FIG. 5g is an exploded perspective view of a screw nut mechanism.

FIG. 5a is a schematic view of the steering assembly, as viewed from its left-hand side, FIG. 5b is a cross section taken along the line Vb—Vb shown in FIG. 5a while FIG. 5c is a cross section taken along the line Vc—Vc shown in FIG. 5a. FIG. 5d shows the steering assembly as viewed in a direction indicated by an arrow Vd shown in FIG. 5c, FIG. 5e is a cross section taken along the line Ve—Ve shown in FIG. 5d, FIG. 5f is the cross section taken along the line Vf—Vf shown in FIG. 5e, and FIG. 5g is an exploded perspective view of a screw nut mechanism D.

Referring to FIG. 5a, a tilting steering mechanism A is adapted to adjust the angle of an upper main shaft 11, on which a steering wheel 10 is mounted, with respect to a lower main shaft 70. The mechanism A comprises a break away bracket 14 mounted below a body 13, defining a dashboard, a d.c. motor B (equivalent to M2 shown in FIG. 6) which is mounted on the bracket 14, a reduction gearing C connected to the motor B, a screw nut mechanism D connected to the reduction gearing C, and an upper bracket 15 which is pivotally mounted on the break away bracket 14 and driven for oscillation by the screw nut mechanism D.

Referring to FIG. 5b, and d.c. motor B has an output shaft 16, on the free end of which is fixedly mounted a worm 17, which is in meshing engagement with a worm wheel which is part of the reduction gearing C. The reduction gearing C is effective to transmit the drive from the motor B to the screw nut mechanism D while reducing the number of revolutions and increasing the magnitude of torque. Specifically, the worm wheel 18 of the reduction gearing C is fixedly mounted on a shaft 19, which is rotatably mounted in the both sidewalls of a housing 20 and a cover 36 by means of bearing bushings 21, 22. A gear 23 is fixedly mounted on the shaft 19 and meshes with a gear 25 which is fixedly mounted on the end of a screw shaft 24 which is part of the screw nut mechanism D. As shown in FIG. 5b, a potentiometer PM2 is coupled to a given shaft in the reduction gearing C, and is effective to detect the angle of rotation of the gear 23, thereby detecting the tilt angle of the upper main shaft 11 or the steering wheel 10.

Referring to FIG. 5c, the screw nut mechanism D will be described. The screw shaft 24 is rotatably journalled in the housing 20 and a stationary member 34 secured to the housing 20 by means of a pair of bearings 31, 32. The housing 20 is secured to the break away bracket 14 by utilizing bolts 20c, 20d and 20e shown in FIG. 5a. The gear 25 is splined at 35 to the end of the screw shaft 34 for integral rotation therewith. The cover 36 is secured to the housing 20 in a manner to cover the gear 25. The screw shaft 24 includes a male thread portion 24a, which is in meshing engagement with a female thread portion 38a formed on a nut 38 of a nut member 37. As shown in FIGS. 5d, 5e and 5f, the nut member 37 comprises the nut 38 which is formed of a resin, and a pair of holding members 39, 40 which are formed of a metal. Both the nut 38 and the holding members 39, 40 are previously molded into an integral unit, which is then assembled with the screw shaft 24.

A pair of circular portions 39a, 40a are formed on the lateral sides of the holding members 39, 40, and the free end of each of the circular portions is formed into a male thread portion 39b or 40b, respectively. As shown in FIG. 5f, a pair of radially extending slits 38b and 38c are formed in the nut 38, and the left and right halves of the nut 38, as viewed in FIG. 5f, are connected together by a thin-walled portion 38d extending around its periphery. The purpose of providing such configuration for the nut 38 is to urge the nut 38 radially toward the screw shaft 24 when it is assembled as shown in FIG. 5c.

Referring to FIG. 5e, at its opposite ends, the nut 38 is provided with a pair of urging means 41A, 41B disposed around its periphery so as to urge the nut 38 radially inward. Specifically, the urging means 41A comprises a tubular member 41 formed of rubber, around which is fitted a metallic holder 43. The other urging member 41B similarly comprises a tubular rubber member 42 around which is fitted a metallic holder 44. A pair of annular grooves 38e, 38f are formed in the peripheral surface of the nut 38, and annular protuberances 41a, 42a formed around the inner periphery of the tubular members 41, 42 are fitted into these grooves. The purpose of such grooves and protuberances is to prevent an axial displacement of the urging members 41, 42 from the nut 38. For the similar purpose, annular grooves 41b, 42b are formed in the outer peripheral surface of the tubular members 41, 42, and annular protuberances 43a, 44a extending from the holders 43, 44 are fitted in these grooves.

As shown in FIG. 5c, a pair of links 51, 52 have openings adjacent to their one end which are fitted around the circular portion 39a or 40a of the holding member 39 or 40, respectively, and are pivotally connected therewith by utilizing a pair of washers 53, 54 and nuts 55, 56. The links 51, 52 are formed with folds 51a, 52a, respectively. It is to be noted that the holders 43, 44 are connected together by means of a pair of plates 57, 58 and bolts 59, 60, as indicated in FIG. 5g, in order to prevent their axial movement away from each other. As shown in FIG. 5c, the other end of each of the links is pivotally connected to the end of the upper bracket 15 with a pair of boss members 64, 65 interposed therebetween, by utilizing a bolt 61, a washer 62 and a nut 63. Accordingly, when the motor B is set in motion, its rotation is transmitted sequentially through the output shaft 16, worm 17, worm wheel 18, gear 23, gear 25 and screw shaft 24, causing the screw shaft 24 to rotate at a low speed about its axis. The assembly comprising the nut member 37 and the tubular members 41, 42 and the holders 43, 44, which is threadably engaged with the shaft 24, is moved axially of the shaft 24. This causes the links 51, 52 to move in the same direction, causing the upper bracket 15 to oscillate to tilt the steering wheel 10.

Figure 5H:
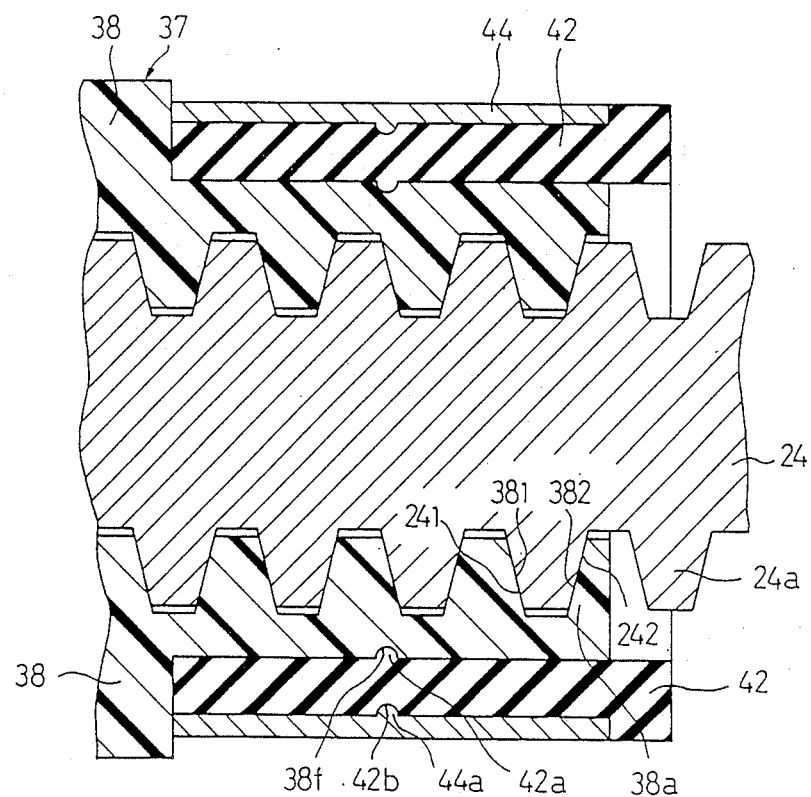
FIG. 5h is an enlarged section showing a meshing engagement between a screw shaft and a nut.

FIG. 5h illustrates the meshing engagement between the screw shaft 24 and the nut 38 in the screw nut mechanism D. In this embodiment, the nut 38 includes slits 38b, 38c, and is urged radially toward the center by means of the tubular rubber members 41, 42 and the metallic holders 43, 44 which are disposed around them. Accordingly, no clearance is developed between the adjacent flanks 241, 242 of the male thread 24a and the flanks 381, 382 of the male thread which abut against these flanks 241, 242 at any phase of operation. The nut 38 is molded from resin for its effectiveness against acoustic chattering effect and abrasion.

FIG. 5i shows a telescopic steering mechanism which is located nearer the steering wheel 10 than the tilting steering mechanism, and FIG. 5j shows a cross section taken along the line Vi—Vi shown in FIG. 5i. The telescopic steering mechanism will now be described with reference to these Figures. The upper main shaft 11 comprises a shaft 212, an outer hollow shaft 214 which is coupled to the shaft 212 through a joint axis 213 which defines the center of tilting movement, and an inner shaft 215 which is fitted into the outer shaft 214 so as to be movable in the axial direction. The left-hand end of the shaft 212, as viewed in FIG. 5i, is connected to a steering gear, not shown. The right-hand end of the inner shaft 215, as viewed in FIG. 5i, is formed with a serration, which is engaged by a support member for the steering wheel 10. Accordingly, when the steering wheel 10 is turned, this causes the inner shaft 215 and the outer shaft 214 to rotate through the engagement between axial serrations 214a, 215a formed on the outer peripheral surface of the inner shaft 215 and on the inner peripheral surface of the outer shaft 214, thus causing the main shaft 212 to rotate.

The outer shaft 214 is rotatably carried by a stationary bracket 217 which is pivotally mounted on the car body by a pivot, not shown, by means of a pair of bearings 218a, 218b. The inner shaft 215 is carried by a movable bracket 219 through a bearing 220 interposed therebetween. The left-hand end, as viewed in FIG. 5i, of the movable bracket 219 is fitted around the right-hand end of the stationary bracket 217 so as to be movable in the lateral direction, as viewed in FIG. 5i. The right-hand end of the movable bracket supports the bearing 220 together with a clamp ring 230 which is locked to the inner shaft 215.

At its left-hand end, the movable bracket 219 has a downwardly depending extension which defines a nut 221, which meshes with a screw 222 which is rotatably carried by the right-hand end of the stationary bracket 217. A support bracket 223 is secured to the stationary bracket 217 and covers the screw 222 while securing a space for movement of the screw 222 (see FIG. 5j). The left-hand end of the screw 222 is integrally formed with a gear 243, which meshes with a worm gear 226 mounted on the shaft 225 of a d.c. motor 224 (equivalent to M3 shown in FIG. 6). The motor 224 is mounted on the stationary bracket 217. When the motor 224 is set in motion, the screw 222 rotates, causing the nut 221 to move axially therealong. In this manner, the movable bracket 219 moves toward or away from the stationary bracket 217, thus inserting or withdrawing the inner shaft 215 into or from the outer shaft 214. The inner shaft 215 carries switch assemblies 231, 232, which are secured to the movable bracket 219.

Figure 6A:
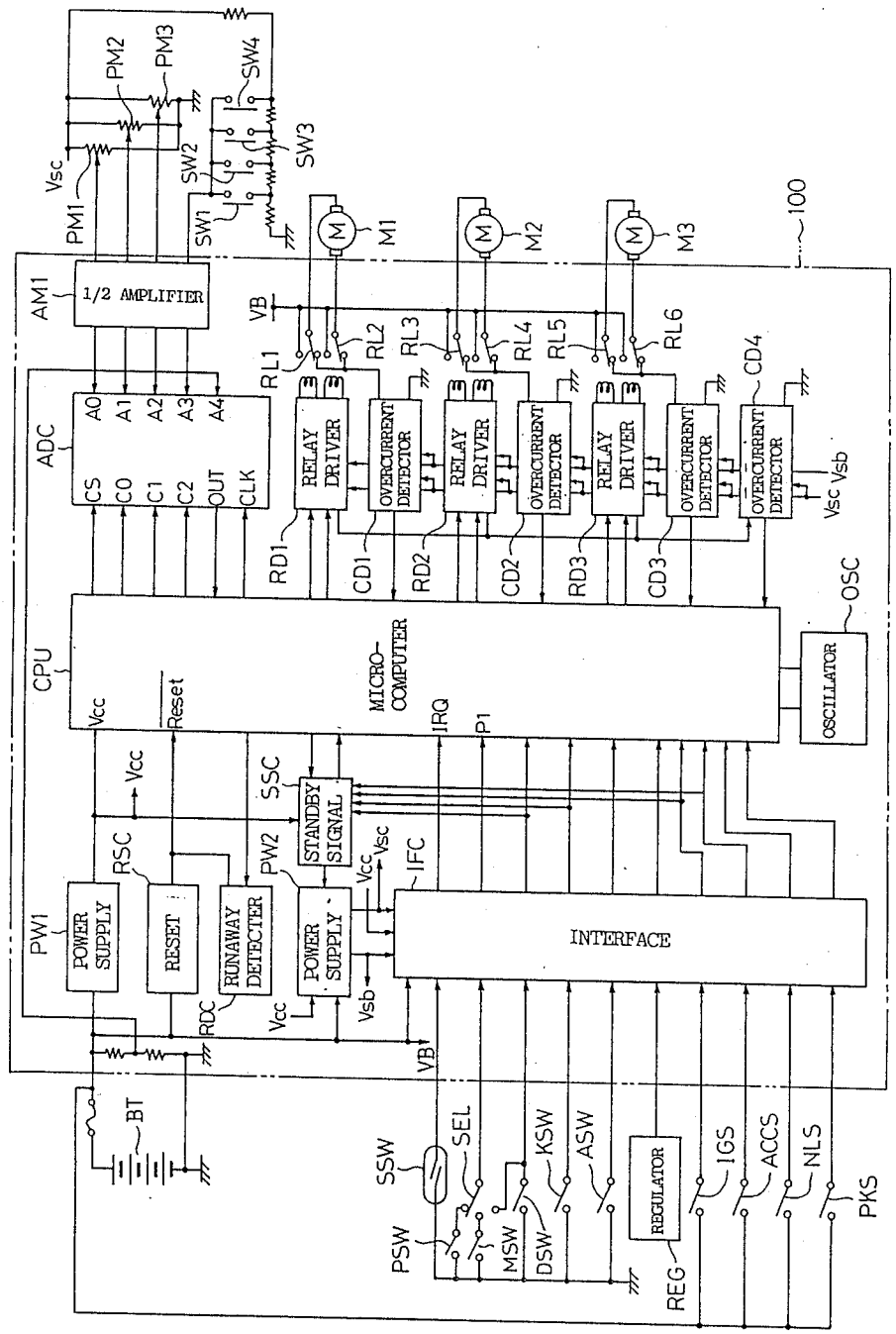
FIGS. 6a and 6b are block diagrams of electric circuits used in the attitude controlling apparatus.

FIG. 6a shows an electrical circuit of an apparatus for controlling the attitude of vehicle mounted device which is installed on the automobile shown in FIG. 1. Specifically, an electronic controller 100 includes a microcomputer CPU, power supply circuits PW1, PW2, reset circuit RSC, runaway detector circuit RDC, standby signal circuit SSC, an interface circuit IFC, an oscillator OSC, an A/D converter ADC, relay drivers RD1, RD2, RD3, overcurrennt detectors CD1, CD2, CD3, CD4, amplifier AM1, and relayes RL1, RL2, RL3, RL4, RL5 and RL6. The microcomuter CPU used in this embodiment is a microcomputer model MB8850 manufactured by Fujitsu, which is a four bit, single chip microcomputer including a read only memory ROM, read-write memory RAM and internal timers/counters. It includes thirty-seven I/O ports and is constructed by C-MOS process. During the standby mode, it is capable of retaining the content of the read-write memory RAM with a reduced power dissipation.

As long as the microcomputer CPU is connected to a battery Bt, it is normally fed (with Vcc), and when no operation is required, CPU is changed to its standby mode in order to minimize unnecessary power dissipation. Accordingly, the stored content of the memory RAM within CPU is retained as long as the battery BT remains connected.

The power supply circuit PW1 converts a voltage output from the onboard battery BT to a constant voltage of +5 V. The reset circuit RSC produces a reset signal when the power is turned on. The runaway detector circuit RDC produces a reset signal in the event no pulse signal is oncoming from CPU for a given time interval. The power supply circuit PW2 supplies given voltages Vsb and Vsc.

Figure 6B:
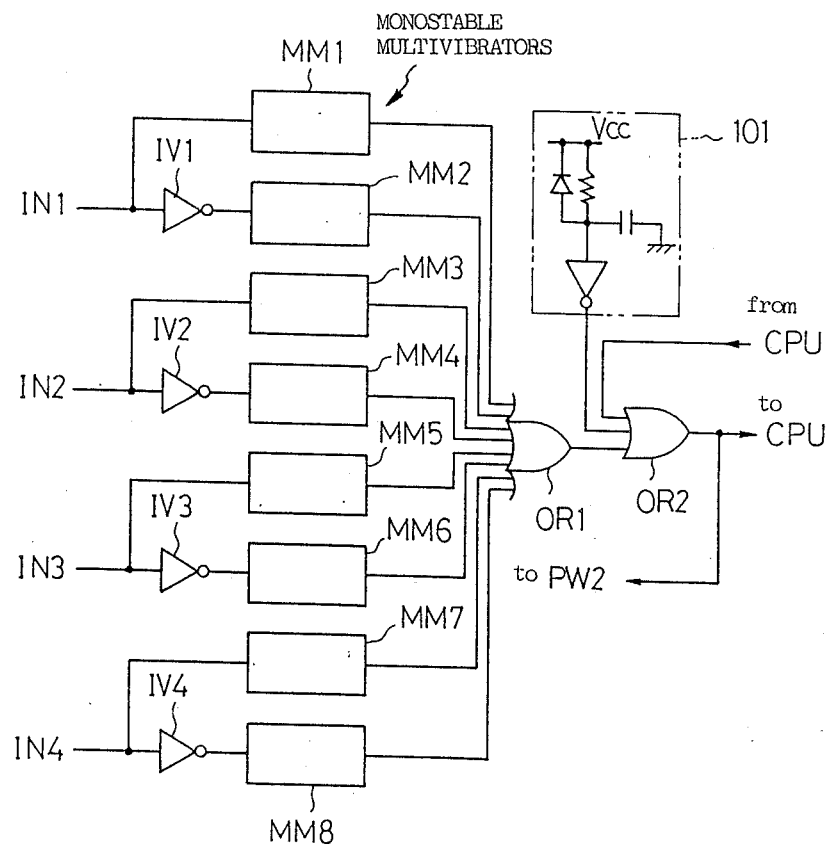

The standby signal circuit SSC is shown in detail in FIG. 6b. As shown, it comprises inverters IV1 to IV4, monostable multivibrators MM1 to MM8, a reset circuit 101, and OR gates OR1 and OR2. When a standby signal (which is developed at a given time interval after the completion of an away operation) is oncoming from CPU, it establishes a standby mode for CPU to turn the power output from the power supply circuit PW2 off. When a change from a high level H to a lower level L or reversely occur at any one of the input terminal IN1 to IN4 of the standby signal circuit SSC during the standby mode of CPU, a wakeup signal is applied to CPU.

The interface circuit IFC produces a binary signal of TTL (transistor-transistor logic) level depending on the status of each switch. The oscillator OSC produces a clock pulse which is applied to the microcomputer CPU. The relay drivers RD1, RD2 and RD3 control the energization of two relays connected thereto in accordance with a command from CPU. The overcurrent detectors CD1, CD2, and CD3 operate to monitor the presence or absence of any overcurrent which passes through the D.C. motors M1, M2 and M3 by means of the relays RL1 to RL6. The overcurrent detector CD4 operates to monitor the presence or absence of any overcurrent passing through the relays used in the relay drivers RD1, RD2 and RD3.

The A/D converter ADC used in this embodiment includes five analog input channels, one of which is selected in accordance with the status prevailing on control terminals C0, C1 and C2. Digital data which is converted is delivered at an output terminal OUT as a serial signal in synchronism with a clock pulse which is applied to a terminal CLK. A terminal CS operates as a chip select.

Various switches connected to the interface circuit IFC will now be described. SSW represents a vehicle speed sensor, or specifically, a reed switch disposed adjacent to a permanent magnet and connected to a speedmeter cable. Thus, if a vehicle is in motion, the switch SSW is opened and closed in accordance with such movement. In the present example, it produces a four pulse signal per revolution of the meter cable. The output terminal of the sensor SSW is connected through the interface circuit IFC to an external interrupt terminal IRQ of CPU. PSW represents a parking switch which is opened or closed in mechanically locked relationship with the parking brake lever 4. MSW represents a manual away switch which commands a manual away operation. DSW represents a door switch mentioned above which is opened or closed in response to the opening or closing of the door. SEL represents a selection switch which selects one of parameters which determine the attitude to enable a drive to get on or off the vehicle during an automatic mode. Either one of the parking switch PSW, manual away switch MSW and door switch DSW can be connected to an input port P1 of CPU through the interface circuit IFC. KSW represents a key switch or commonly referred to as an unlock warning switch which is opened or closed in response to the insertion or withdrawal of the engine key 2. ASW represents an automatic switch which specifies whether the attitude controlling mode is to be validated or invalidated.

A regulator REG is provided in order to stabilize the output of an alternator connected to the output shaft of an engine. IGS represents an ignition switch which is opened or closed in respone to an operation of the engine key 2. When the ignition switch is turned on, an ignition circuit associated with the engine is electrically energized. ACCS represents an accessory switch which is opened or closed in response to an operation of the engine key 2, generally in the same manner as the ignition switch IGS. When the switch ACCS is turned on, a power supply for accessories or onboard electrical circuits other than an engine drive system is turned on. NLS represents a neutral switch which is turned on when the shift lever 3 of the sutomatic transmission assumes its neutral position and is turned off otherwise. PSK represents a parking position switch which is turned on when the shift lever 3 assumes its parking position and is off otherwise.

The d.c. motor M1 is designed to drive a seat, and is connected to the relays RL1 and RL2. The d.c. motor M2 is designed to drive a tilting operation, and is connected to the relays RL3 and RL4. The d.c. motor M3 is designed to drive the telescoping operation, and is connected to the relays RL5 and RL6. The seat attitude and the tilting attitude as well as the telescoping attitude of the steering wheel are detected by the potentiometers PM1, PM2 and PM3, the output terminals of which are connected through the amplifier AM1 to the input channels A0, A1 and A2 of the A/D converter. Manual attitude controlling switches SW1, SW2, SW3 and SW4 have their one end connected to individual taps on a resistive voltage divider which has its one end connected to a supply line, and the other end of these switches is connected in common and connected to the input channel A3 of the converter ADC. A resistive voltage divider is also connected across the battery BT and has its tap representing an output terminal connected to the input channel A4 of the converter ADC. Accordingly, the microcomputer CPU is capable of recognizing the seat attitude, the tilting attitude and the telescoping attitude of the steering wheel, the status of the manual attitude controlling switches SW1 to SW4 as well as the output voltage from the battery BT, by selecting a given channel and reading the output from the A/D converter.

FIGS. 7a, 7b, 7c, 7d, 7e, 7f, 7g, 7h, 7i, 7j, 7k, 7l and 7m are flowcharts representing the operation of the microcomputer CPU. Principal registers and flags which appear in FIGS. 7a to 7m will be described first:

Limit position preset flags . . . These flags indicate whether or not a limit position for an extent of movement of each mechanism has been stored. It assumes "O" when the power is turned on and assumes "1" when the storage is completed. The following flags are used:

F1U . . . The upper limit position for the tilting mechanism.

F1D . . . The lower limit position for the tilting mechanism.

F1S ... The minimum length position for the telescopic mechanism.

F1L ... The maximum length position for the telescopic mechanism.

F1 ... Standing for F1U, F1D, F1S and F1L collectively.

Manual limit stop flags ... These flags cause the movement to be stopped at the stored limit position during the manual attitude controlling operation. The flags normally assume "0" and assume "1" when the manual switch is changed from its on to its off position. These flags are used in a limit position re-establishing mode. The flags include the following.

F2U ... The upper limit position for the tilting mechanism.

F2D ... The lower limit position for the tilting mechanism.

F2S ... The minimum length position for the telescopic mechanism.

F2L ... The maximum length position for the telescopic mechanism.

F2 ... Standing for F2U, F2D, F2S and F2L collectively.

Stop Flags ... These flags are set to "1" whenever a motor locked condition (overcurrent condition), a timeover or an overload (minimal rate of change in the attitude) is detected in each of the mechanisms, and is cleared to "0" when the motor drive is interrupted. These flags include the following:

F31 ... Associated with the tilting mechanism.

F32 ... Associated with the telescopic mmechanism.

F33 ... Associated with the seat mechanism.

F3 ... Standing for F31, F32 and F33 collectively.

Refresh flags ... These flags are set to "1" whenever a stored attitude which is used to operate each of the individual mechanisms is updated, and normally assumes "0". The flags include the following:

F41 ... Associated with the tilting mechanism.

F42 ... Associated with the telescopic mechanism.

F4 ... Standing for both F41 and F42 collectively.

Drive flags ... These flags indicate whether each mechanism is in the course of driving when automatically controlling the attitude. The flags assume "0" when the mechanism is at rest and is set to "1" when the drive is initiated. These flags include the following:

F5A$a$ ... For tilting away operation.

F5R$a$ ... For tilting return operation.

F5A$b$ ... For telescoping away operation.

F5R$b$ ... For telescoping return operation.

F5A$c$ ... For seat away operation.

F5R$c$ ... For set return operation.

F5 ... Standing for all of the six flags defined above.

Reversal flags ... These flags are set to "1" when an overload is detected in each of the mechanisms, and are cleared to "0" after reversing through a given stroke, after reversal for a given time period or when a given attitude is detected. These flags include the following:

F6$a$ ... For tilting mechanism.

F6$b$ ... For telescoping mechanism.

F6$c$ ... For seat mechanism.

F6 ... Standing for all of F6a, F6b and F6c.

Tilting timer ... This timer counts the timer interval during which the tilting mechanism is driven, and is incremented by one each time 60 msec passes.

Telescoping timer ... This counts the time period during which the telescoping mechanism is driven, and is incremented by one each time 60 msec passes.

Seat timer ... This counts the timer period during which the seat drive mechanism is driven, and is incremented by one each time a timer interrupt is executed.

60 msec counter ... This timer is incremented by one each time a timer interrupt is executed, and is reset to "0" when it has counted up 60 msec, followed by initiating another counting operation.

Vehicle speed timer ... This timer determines the timer period from the falling edge to the next falling edge of a signal fed from the vehicle speed sensor SSW, and is incremented by one each time 60 msec passes.

Tilting reversal timer ... This timer counts the length of time from the time when the reversal flag for the tilting mechanism is set to "1", and is cleared to "0" when the time period reaches $t_3$.

Telescoping reversal timer ... Similar to the tilting reversal timer.

Seat reversal timer ... Similar to the tilting reversal timer.

Standby timer ... This timer is used to establish a standby mode for CPU; this develops a standby signal after a given time interval $t_4$ has passed.

In response to the power being turned on, the microcomputer CPU begins the execution of the processing operation, starting with the beginning of the main routine shown in FIG. 7$a$ (power on). The microcomputer also executes two other processing operations which are separate from the processing operation of the main routine; one relates to an external interrupt processing (see FIG. 7$l$) which is responsive to an external interrupt from the vehicle speed sensor SSW, and the other relates to a timer interrupt processing (see FIG. 7$k$) which takes place each time an internal timer has reached a given count. In the present example, the timer interrupt occurs every 5 msec.

An external interrupt will be described first. In this interrupt, a processing operation takes place which determines a vehicle speed. The value of the vehicle speed timer is cleared to zero each time the external interrupt is processed, and is also incremented in response to a timer interrupt operation which is executed every 5 msec. Accordingly, when an external interrupt occurs, the timer has a value corresponding to the length of time which has passed since the completion of the previous interrupt operation.

The external interrupt is produced in response to the falling edge of a vehicle speed signal, in this example, so that the vehicle speed timer has a value which is equivalent to one period of the vehicle speed signal. In actuality, four samples are obtained and their mean value calculated in order to avoid influences of a variation in the duty cycle of the sensor. At this end, four vehicle speed registers SP0, SP1, SP2 and SP3 are used. Each time an external interrupt is processed, the content of the registers SP3, SP2 and SP1 is transferred to the registers SP2, SP1 and SP0, respectively, thus allowing the latest vehicle speed to be stored in the register SP3. The content of the four registers SP0 to SP3 is added together to provide a measured vehicle speed. Since the value is indicated in terms of the period of the vehicle speed pulse, a greater value of the measured vehicle speed corresponds to a lower vehicle speed in a contrary manner to an ordinary notation.

A timer interrupt will now be described. When the internal timer of the microcomputer counts 5 msec, the program jumps to the initial portion of the timer interrupt operation shown in FIG. 7$k$. The content of various registers is saved. A next timer interrupt is enabled, and the status of various input ports is read, followed by incrementing 60 msec counter by one. Unless the 60 msec counter reaches a count corresponding to 60 msec, the content of the registers is returned to the respective registers, whereupon the program immediately returns to the main routine.

However, when the counter has a count corresponding to 60 msec, the following processing operations are performed: Initially, the 60 msec counter is cleared, while incrementing the vehicle speed timer, the tilting timer, the telescoping timer and the seat timer by one. A/D converter ADC is controlled to read the tilting attitude, the telescoping attitude, the seat attitude, the battery voltage and the status of the manual attitude controlling switches SW1 to SW4.

A mean rate of change in the attitude is derived from attitude information obtained. Considering the tilting attitude, for example, four tilting attitude registers TIPm (m=0 to 3) are provided to store four values of the tilting attitude. In addition, there are provided five rate of tilt registers TISPn (n=0 to 4) in order to store information representing five rates of tilt. The latest tilting attitude is stored in register TIP0, the previous tilting attitude is stored in TIP1, and the immediately preceding tilting attitude is stored in the register TIP2. In the example shown, a difference, in absolute value, between the second previous attitude and the latest attitude is stored in the rate of tilt register TISP0. Other registers TISP1, TISP2, . . . store the previous rate of tilt, the second previous rate of tilt and so on. Five values representing the consecutive rates of tilt are added together, with the sum stored in register TISP as a measured rate of tilt. Subsequently, the content of tilting attitude register TIP(m) is transferred to register TIP(m+1) and the content of each rate of tilt register TISP(n) is transferred to register TISP(n+1).

The processing operations for the telescoping attitude and the seat attitude take place in the similar manner as for the tilting attitude. TEP(m) represents a telescoping attitude register, and TSP(n) represents a rate of telescoping register. Similarly, STP(m) represents a seat attitude register, and SEP(n) represents a rate of change in seat attitude register. When the tilting refresh flag and the telescoping refresh flag are "1"'s, the content of the tilting attitude register TIP0 and the telescoping attitude register TEP0 is stored as latest stored attitude in a memory.

The monitoring of any overload and the determination of the condition to stop a reversal operation based on the detection of an overload are performed for each of the tilting mechanism, the telescoping mechanism and the seat drive mechanism. Initially considering the tilting mechanism, when the tilting motor M2 is off, no operation takes place, and the program proceeds to the following step. However, when the tilting motor M2 is on, the tilting reversal flag F6a normally assumes "0", and the program proceeds to the detection of an overload. However, if the tilting timer contains a value which is equal to or less than a given time interval $t_1$, the detection of an overload is masked in order to avoid the detection of a rush current when the motor is turned on.

When the tilting timer has a value equal to or greater than $t_1$, three conditions are determined. One condition is the detection of a large current which may be detected in each of the overcurrent detectors CD1 to CD3. This may occur when the motor has locked. Another relates to an overflow of the tilting timer. The control of the attitude normally is completed within a period on the order of two or three seconds, but if some abnormality occurs, the motor may be continuously driven over a prolonged time period. In the present example, the occurrence of an abnormality of determined when the drive time for the tilting operation reaches five seconds. The third condition relates to a rate of change in the tilting attitude. As mentioned previously, information concerning the rate of change in the tilting attitude is stored in the register TISP. In the normal operation, information which represents the attitude changes with a given slope as long as the motor is being driven, so that the value stored in the register TISP may be compared against a given value which is predetermined within the program to determine the occurrence of an overload if the rate of change in the attitude is slower than the given value. If the abnormality is found in any one of these three conditions, the tilting stop flag F31 is set to "1".

As will be described later, if the tilting stop flag F31 is set to "1", the tilting reversal flag F6a is set to "1" in the main routine. When the tilting reversal flag is set to "1", the program proceeds to the determination of conditions to stop the reversal operation. In the present example, the determination is made on the basis of three conditions. Of the highest priority is the stroke. Specifically, the attitude which prevails when the presence of an overload is detected is compared against the current attitude, and when it is determined that the stroke has reached a given value, the reversal mode is terminated. Normally, the motor comes to a stop in response to this determination. Another condition is satisfied when a predetermined attitude is achieved, and the remaining condition is satisfied when the time duration of the reversal mode has reached a given value $t_3$ or when time-over has occurred. If any one of these conditions is satisfied, the tilting reversal flag is cleared to "0" and the tilting reversal timer is cleared.

Considering the processing operation for the telescoping mechanism (see FIG. 7l), no operation takes place when the telescoping motor M3 is off, in the similar manner as in the tilting mechanism, and the program proceeds to the following step. However, when the motor M3 is on and the telescoping reversal flag F6b is "0", the program proceeds to the detection of an overload. Again, the detection of an overcurrent, an overflow from the telescoping timer and a rate of change in the telescoping attitude are three conditions, which cause the telescoping stop flag F32 to be set to "1" if an abnormality or overload is found in any one of these. As will be described later, when the telescoping stop flag is "1", the telescoping reversal flage F6b is set to "1" in the main routine. When the telescoping reversal flag is "1", a determination is made as to the conditions to stop the reversal, which are three in number again. Specifically, if the reversing stroke is equal to or exceeds the given value, if the telescoping attitude has reached a predetermined attitude, if the time duration of the reversal reaches a given value $t_3$, the telescoping reversal flag is cleared to "0" and the telescoping reversal timer is cleared.

The processing operation for the seat drive mechanism (see FIG. 7m) will be considered next. In the similar manner as with the tilting mechanism, no operation takes place when the seat motor M1 is off, and the program proceeds to the following step. However, when the motor M1 is on and the seat reversal flage F6c is "0", the program proceeds to the detection of an overload. Again, three conditions are the detection of an overcurrent, an overflow from the seat timer and a rate of change in the seat attitude, and the presence of an abnormality or overload in any one of these causes the seat stop flag F33 to be set to "1". As will be described later, when the seat stop flag is "1", the seat reversal flage F6c is set to "1" in the main routine. When the seat reversal flag is "1", a determination is made as to the conditions to stop the reversal, which is again three in number. Thus if the reversing stroke is equal to or exceeds the given value, if the seat attitude has reached a predetermined attitude, or if the time duration of the reversal has reached the given time $t_3$, the seat reversal flag is cleared to "0" and the seat reversal timer is cleared. An output from the overcurrent detector CD4 is then examined to see if there is any overcurrent which flows through the relays RL1 to RL6. If the existence of an overcurrent is found, the relay or relays are turned off.

The main routine shown in FIG. 7a will now be described. When the power is turned on, an initialization takes place. Specifically, initial conditions (motor off) are established at the output ports, and memories which are used as counters, registers and flags are cleared. At this time, all of the limit position preset flags F1 are cleared to "0". An output from the regulator REG is then examined. If the engine is in operation, a given voltage which is equal to the battery voltage is applied to the regulator REG, but if the engine is turned off, the voltage will be zero. In this manner, the occurrence of an engine operation is determined by monitoring an output from the regulator REG. As long as the engine is in operation, a manual attitude control depending on the manual attitude controlling switches SW1 to SW4 is enabled. The manual attitude control is also enabled when the ignition switch IGS is on. If a change occurs in the status of the manual switches SW1 to SW4, the tilting timer and the telescoping timer are cleared.

The manual attitude control which takes place immediately after the power is turned on or before the limit positions are not yet established will be described first. In response to a manual tilt up command, which is indicated by the on condition of the switch SW1, the limit position preset flag F1U is "0" initially, the program normally proceeds to a repeated execution of steps 9-10-11-23-2-4-6-7-.... When the switch SW1 is turned on or when the time since the tilting timer $t_1$ has been cleared exceeds 0.06 second, the program proceeds from step 9 to step 14 where a drive off condition is established for the tilting motor. When the time elapsed exceeds 0.26 second, the program proceeds from step 9 to step 10 again, conditioning the tilting motor to be driven in the up direction.

In other words, in the manual operation, a continued depression of the swtich causes the attitude to be controlled during an initial period of 0.06 second (TA), followed by interrupting the attitude control, and after 0.2 second (TB) has passed, the attitude control is reinitiated (see FIG. 8). The attitude control is immediately interrupted when the switch is turned off. By utilizing such operation, a fine adjustment in the attitude during the manual operation is simplified. Thus, if the manual switch is turned on and is then again turned off (that is, ceasing to depress the switch which has been once depressed), as long as the time (TC, TD) required to perform such operation is in a range from 0.06 second to 0.26 second, the tilting motor is driven over a given period (0.06 second) for any single operation. Thus, if the switch is operated very slowly, the attitude cannot be changed rapidly over a target position in response to a single switch operation. In this manner, the switch may be operated several times to bring the attitude to a target position step by step, facilitating an accurate positioning.

When the manual tilt up switch SW1 continues to be depressed, the tiling mechanism will reach its mechanical limit position. Before this occurs, an overload is detected by the timer interrupt operation (FIG. 7k), and the tilting stop flag F31 is set to "1" at step 319. Subsequently, when the program proceeds through the main routine to step 10, it then jumps to step 20 since the flag F31 is "1". At step 20, the tilting motor ceases to be driven. In actuality, after waiting for a time period of 0.1 second which is required to allow the motor to stop, data is derived corresponding to a position which is set back in the down direction (corresponding to a shift of about 1.5 mm for the steering wheel) from the prevailing attitude which is represented by the content of register TIP0, and the data is stored in a tilt upper dead center memory. Thus, the position stored in the upper dead center memory is slightly short of the mechanical limit position. Accordingly, by controlling the motor drive so that the position stored in the upper dead center memory is not exceeded, a mechanical collision can be avoided, since then the mechanism is incapable of reaching the actual limit position. The limit position preset flag F1U is then set to "1".

Subsequently, the program proceeds through steps 21 and 22 where the tilting motor is driven in the down direction until the upper dead center which is just stored is reached, whereupon the tilting motor is stopped. This minimizes adverse influences caused by excessive stresses which may be developed when the tilting mechanism is located at its mechanical limit position. When the manual switch SW1 is turned on subsequently, the program proceeds through steps 2-4-6-7-8 since the flage F1U is "1". If the tilting position reaches the stored upper dead center, the program proceeds through steps 13-14, ceasing to drive the tilting motor. In this manner, the tilting mechanism cannot be driven beyond the stored position during the manual operation.

However, it will be seen that the existence of an overload may be detected before the limit position is reached if a foreign matter is held sandwiched within the tilting mechanism when the limit position is to be stored. In such instance, a wrong position may be stored in the upper dead center memory, restricting the extent of movement allowed for the tilting mechanism. For this reason, a re-establishing mode is provided in the present embodiment. Specifically, when the switch SW1 continues to be depressed to cause the tilting mechanism to reach the stored upper dead center, the switch SW1 is momentarily turned off and is then depressed to establish the re-establishing mode. Thus, when the switch SW1 is changed from its on to its off condition, the program proceeds through steps 2-4-5-6-15-16, and if it is determined at step 16 that the tilting mechanism is located at its upper dead center, the manual limit stop flag F2U is set to "1". At next step 19, the tilting motor is temporarily stopped, but when the manual switch SW1 is turned on again, the program proceeds through steps 2-4-5-6-7-8-13, and since the flag F2U is "1", the program then proceeds from step 13 to step 12 where the limit position preset flag F1U is cleared to "0". Accordingly, during the next pass, the program proceeds through steps 2-4-6-7, and since the flag F1U is "0", the step 8 which examines the upper dead center is skipped, and the tilting mechanism continues to change its attitude until it reaches the mechanical limit position or until the flage F31 is set to "1", thus storing a new limit position in a memory.

Figure 7C:
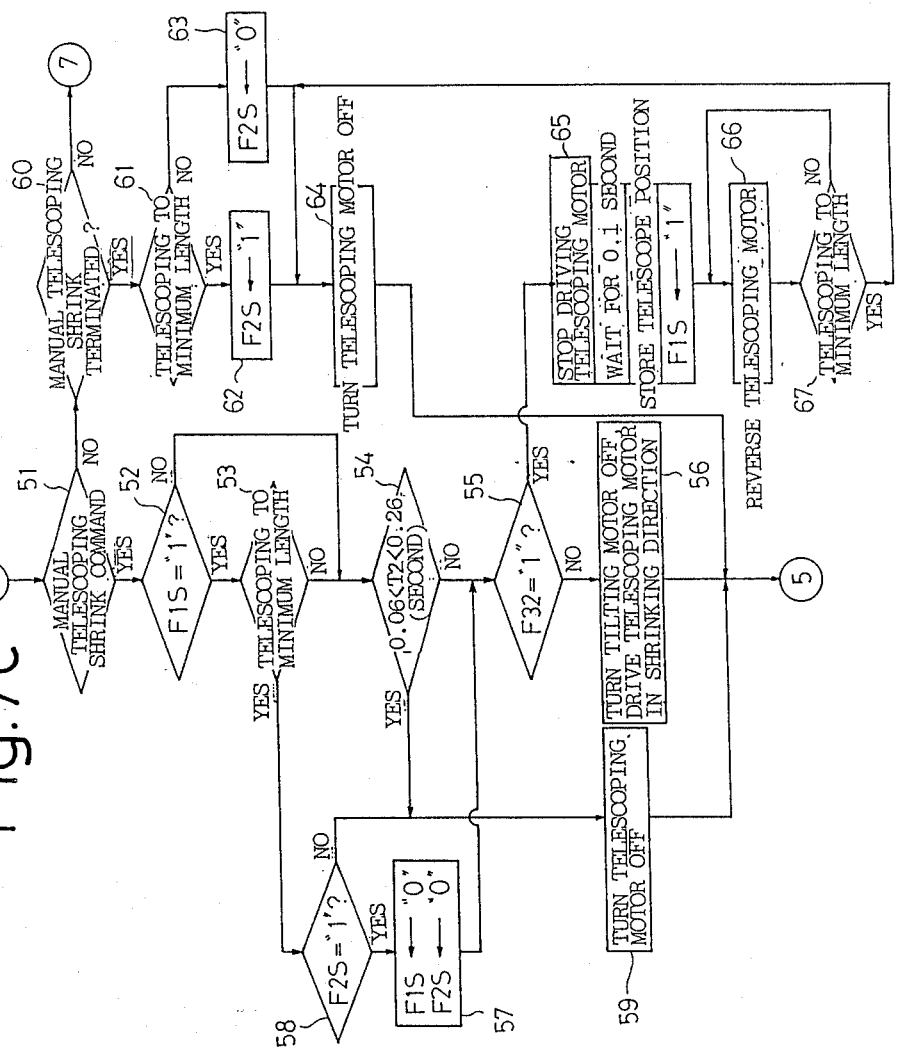
Figure 7D:
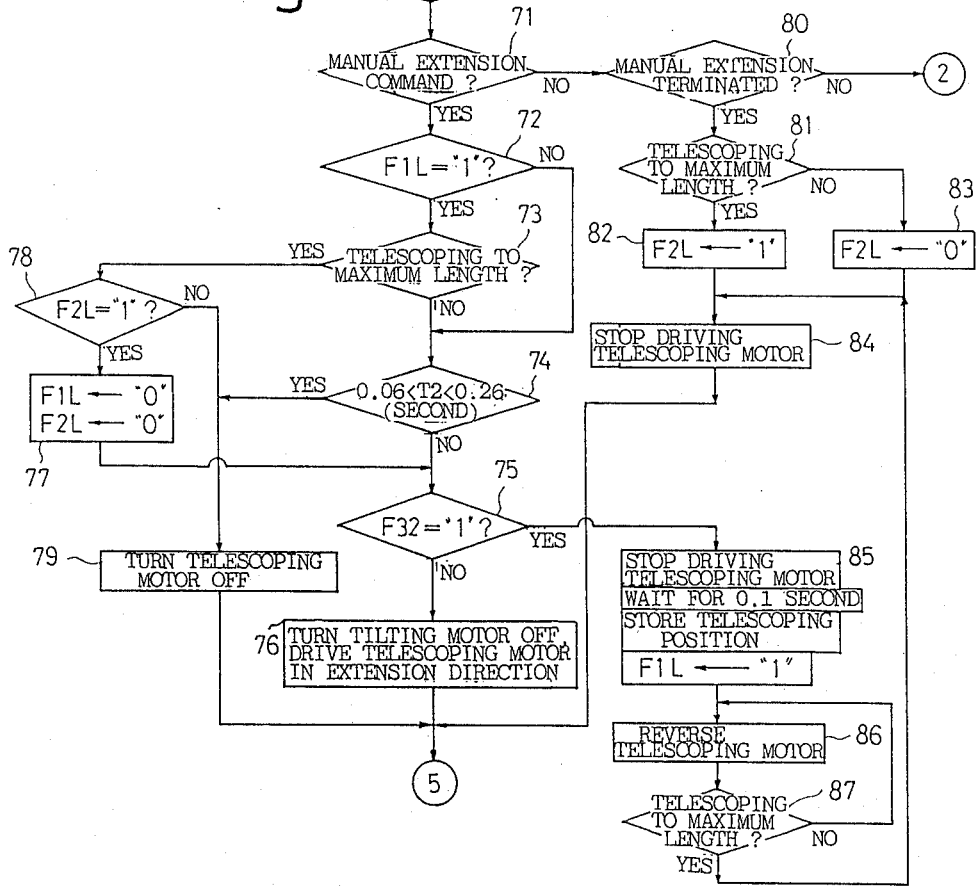

The manual tilt down operation, the manual telescoping shrinkage operation and the manual telescoping extension operation are similar to the manual tilt up operation described above. Specifically, the manual tilt down operation takes place by operating the switch SW2. The manual telescoping shrinkage operation takes place by operating the switch SW3. The manual telescoping extension operation takes place by operating the switch SW4. The major steps for these operations are illustrated in FIGS. 7b, 7c and 7d, respectively.

An automatic attitude control which takes place when a driver gets on or off a vehicle will now be described. The automatic attitude control is performed in the present example when the automatic switch ASW is on and the battery voltage has a normal value. In addition, when the key switch KSW is off or when the engine key 2 is not inserted into the key cylinder, the away operation which positions the steering wheel to a retracted attitude is performed, recognizing the possibility that a driver may get on or off the vehicle. Furthermore, when the key switch KSW is on or when the engine key 2 is inserted into the key cylinder, the return operation which positions the steering wheel to its stored attitude which it assumed before retracting it is performed, recognizing the possibility that a driver may drive the vehicle.

The away operation will be described first. When the output from the regulator is zero, indicating that the engine is at rest and the ignition switch is off, the program proceeds through steps 2-3, or alternatively when the output from the regulator is normal and the ignition switch IGS is on, the program proceeds through steps 2-4-6-15-31-40-51-60-71-80, proceeding to step 91 shown in FIG. 7e in each instance. When the automatic switch ASW is on, the battery voltage is normal and the key switch KSW is off, the program proceeds through steps 91-92-93 to step 121 shown in FIG. 7f. If it is found at this step that the vehicle speed is less than 10 km/h and the input port P1 of CPU assumes a low level L, the program proceeds through steps 121-122-123, performing the away operation.

Initially, the refresh flag F4 is cleared to "0", and the limit position preset flag F1S is examined. If the limit position has not yet been established, the program proceeds through steps 125-132-133. Since the tilt away drive flag F5Ad is "0" initially, the program proceeds to the next step 134 where the telescoping motor is conditioned to be driven in a direction to achieve a shrinkage, the flag F5Ab is set to "1" and the telescoping timer is cleared. Accordingly, the steering wheel is driven in a direction to reduce the length of the rotary shaft.

When the telescopic mechanism reaches its mechanical limit position and abuts against a given stop, an overload is detected by the timer interrupt operation, whereby the telescoping stop flag F32 is set to "1" at step 326 shown in FIG. 7l. When the flag F32 is "1", the program proceeds from step 132 to steps 138 to 139 in the main routine (FIG. 7f). The detail of the step 138 or the operation of the telescoping stopsubroutine is illustrated in FIG. 7h. Referring to FIG. 7h to describe this subroutine, the telescoping motor ceases to be driven, and the program waits for a time of 0.1 second until the motor actually stops, and then examines the flag F5Ab. In the instance described above, the telescoping away Flag F5Ab is "1", and hence the program proceeds to step 223. Since the limit position preset flag F1S is "0", the program proceeds to step 228 where data is derived for storage in a minimum length telescoping position memory, corresponding to a position which is set back from the prevailing attitude (stored in register TEPO) in a direction to increase the length of the steering wheel (by an amount corresponding to about 1.5 mm in this example). The limit position preset flag F1S is then set to "1". The telescopic mechanism is then driven in a direction to increase the length of the shaft until the upper dead center which has been just stored in the minimum length telescoping position memory is reached, whereupon the telescoping motor ceases to be driven. Accordingly, the limit position is automatically established in the away direction by merely setting up the away operation without any operation similar to that used during the manual attitude control. This avoids the occurrence of a situation that the limit position fails to be established for a prolonged period of time because of a failure of a driver to perform an attitude control.

Returning to FIG. 7f to continue the description, when 0.3 second passes since the initiation of the away operation which initiates driving the telescopic mechanism or when the telescoping timer $T_2$ has a value which exceeds 0.3 second, the program proceeds through steps 135-128-129-130. Since the tilting mechanism is at rest initially, the tilt away flag F5As is now "0". Thus the program proceeds to step 131 next, where the tilting motor is conditioned to be driven in the up direction, the tilting away flag F5Aa is set to "1" and the tilt timer $T_1$ is cleared. In other words, in the present embodiment, during the away operation, the telescopic mechanism begins to be driven in a direction to reduce its length initially, and after 0.3 second has passed, the tilting mechanism begins to be driven in the up direction. The purpose of initiating the drive at displaced point in time is to eliminate any influence of a rush current when beginning to energize an electric motor. Specifically, a very high transient or rush current flows through the motor when beginning to energize it, and hence if a plurality of motors begins to be energized simultaneously, the total current drain from the battery will increase very sharply and temporarily, giving rise to the likelihood that a malfunctioning may occur in the electrical circuit. However, if the initiation of energizing one motor is displaced in time from the initiation of energizing another motor by an amount which is required for the transient current to subside satisfactorily, the total current can be maintained at a relatively low level if a plurality of motors are simultaneously driven (see FIG. 9). Thus, if the telescopic mechanism and the tilting mechanism are controlled substantially simultaneously, the time required to complete the attitude control or a retracting operation will be reduced to substantially one-half the time required when these mechanisms are controlled in a sequential order.

When retracting (away operation), it is preferred to initiate driving the telescopic mechanism first, followed by driving the tilting mechanism as disclosed in the embodiment, since a reduction in the length of the shaft for the steering wheel provides a greater effect of releasing the driver as compared with the tilting operation.

When the telescopic mechanism reaches the stored minimum length position after the limit position preset flag F1S has been set to "1", the program proceeds from step 126 to step 127 in FIG. 7f where the telescoping motor ceases to be driven and the telescoping away drive flag F5Ad is cleared to "0".

Where the upper dead center for the tilting mechanism is not stored, performing the away operation causes the mechanism to reach its mechanical limit position. In this instance, the existence of an overload is detected by a timer interrupt operation, whereby the tilt stop flag F31 is set to "1" at step 319 shown in FIG. 7k. When the flag F31 is set to "1", the program proceeds from step 129 to step 136 in FIG. 7f. The operation which takes place at step 136 or the tilt stop subroutine is shown in detail in FIG. 7g. Referring to FIG. 7g to describe this subroutine, the tilting motor initially ceases to be driven, and the program waits for a time of 0.1 second in order to allow the motor to stop actually, and then examines the flag F5Aa. In the present instance, the tilt away flag F5Aa is set to "1", so that the program then proceeds to step 203. Since the limit position preset flag F1U is "0", the program then proceeds to step 208 where data is obtained for storage in a tilt upper dead center memory, corresponding to a position which is set back or returned slightly in the down direction from the prevailing attitude (stored in register TIP0), in a similar manner as in the manual operation. The limit position preset flag F1U is then set to "1". The tilting mechanism is then driven in the opposite direction or in the down direction until it reaches the upper dead center which has been just stored in the tilt upper dead center memory, whereupon the tilting motor is deenergized. Accordingly, all that is required to establish the limit position in the away direction for the tilting mechanism in an automatic manner is to set up an away operation, without requiring any special manual attitude controlling operation. Once the limit position is stored in response to the manual attitude control or the automatic attitude control, the flags F31 and F32 cannot be set to "1" unless some abnormality occurs, allowing the attitude controlling operation by the tilting and the telescopic mechanism to be terminated. When the telescopic mechanism has reached its minimum length point and the tilting mechanism has reached the upper dead center, a retracting movement for the steering wheel is completed. A corresponding operation for the seat will be described later.

The return operation will now be considered. If the key switch KSW is turned on when the automatic switch ASW is on and the battery exhibits a normal voltage, the program proceeds through steps 91-92-93 to step 98 where the return operation takes place. Initially, the standby timer is cleared, followed by examining the limit positio preset flag F1D. If it is not yet preset, the program proceeds through steps 99-106-107. Since the tilting return drive flag F5Ra initially assumes "0", next step 108 is executed where the tilting motor is driven in the down direction, the flag F5Ra is set to "1" and the tilting timer T₁ is cleared. In response thereto, the steering wheel is driven from its retracted position or the upper dead center toward the lower dead center. When the tilting mechanism reaches its mechanical limit position or the lower dead center and abuts against a given stop, an overload condition is detected by a timer interrupt operation. Accordingly, the flag F31 is set to "1" at step 319 shown in FIG. 7k. When the flag F31 is set to "1", the step 106 is followed by step 112, which means that the stop tilting subroutine is executed. In this instance, because the flag F5Aa is "0", the program proceeds through steps 201-202-211. Since the limit position preset flag F1D is now "0", the program then proceeds to step 212. At step 212, data is obtained which is reached by moving back in the upward direction (which corresponds to about 1.5 mm in the present example) as referenced from the prevailing attitude (TIPO), and is stored in the tilting lower dead center memory. The tilting mechanism is then driven toward the upper dead center until the lower dead center which has just been stored in the tilting lower dead center memory is reached, whereupon the tilting motor is deenergized. Accordingly, the lower dead center for the tilting mechanism is automatically established by setting up a return operation, without requiring any special manual attitude control.

Returning to FIG. 7e to continue the description, when the return operation is initiated and the tilting timer T₁ has a value which exceeds 0.3 second after the drive of the tilting mechaism has been initiated, the program proceeds through steps 109-114-103-104. Since the telescopic mechanism is at rest initially, the telescopic return drive flag F5Rb is "0". Accordingly, the program then proceeds to step 105 where the telescoping motor is driven in a diection to extend the shaft of the steering wheel, the flag F5Rb is set to "1" and the telescoping timer T₂ is cleared. In other words, in the present embodiment, the return operation starts with beginning to drive the tilting mechanism in the down direction, followed by beginning to drive the telescopic mechanism in a direction to extend its length after 0.3 second has passed thereafter. The purpose of such time offset is to avoid an adverse influence of rush currents when the motors begin to be energized, in the similar manner as mentioned above in connection with the away operation.

In the present embodiment, the return operation is initiated with driving the tilting mechanism first, followed by driving the telescopic mechanism to achieve a desirable result. Specifically, extending the shaft of the steering wheel gives a greater degree of oppression upon the driver than driving the tilting mechanism in the down direction. Hence, the telescopic mechanism follows the tilting mechanism during the return operation in order to avoid the oppressing sensation upon the driver.

When the maximum length point of the telescopic mechanism is not stored, the return operation will bring the mechanism to its mechanical limit position or maximum length point. In this instance, an overload condition is detected by a timer interrupt operation, whereby the telescoping stop flag F32 is set to "1" at step 326 in FIG. 7l. When this flag is "1", the program proceeds from step 103 to step 110.

The step 110 represents a stop telescoping subroutine where the telescoping motor is initially deenergized, and the program waits for a time interval of 0.1 second in order to wait for the motor to stop mechanically. The flag F5Ab is then examined. Since it is now in the course of the return operation, the flag F5Ab is "0". Accordingly, the program proceeds to step 231 where the limit position preset flag F1L is examined. Since the flag F1L is initially "0", the program then proceeds to step 212 where data is obtained and stored in the telescoping maximum length point memory which corresponds to a position which is reached when moving back in a direction to reduce the length of the telescopic mechanism through a small distance (corresponding to about 1.5 mm in the present example) as referenced to the prevailing attitude (TEP0). The telescopic mechanism is then driven in a direction to reduce its length until the maximum length point which has just been stored in the telescopic maximum length point memory is reached, whereupon the telescoping motor is deenergized. In this manner, the maximum length point of the telescopic mechanism is automatically established by merely setting up a return operation, without requiring any special manual attitude control.

Figure 7E:
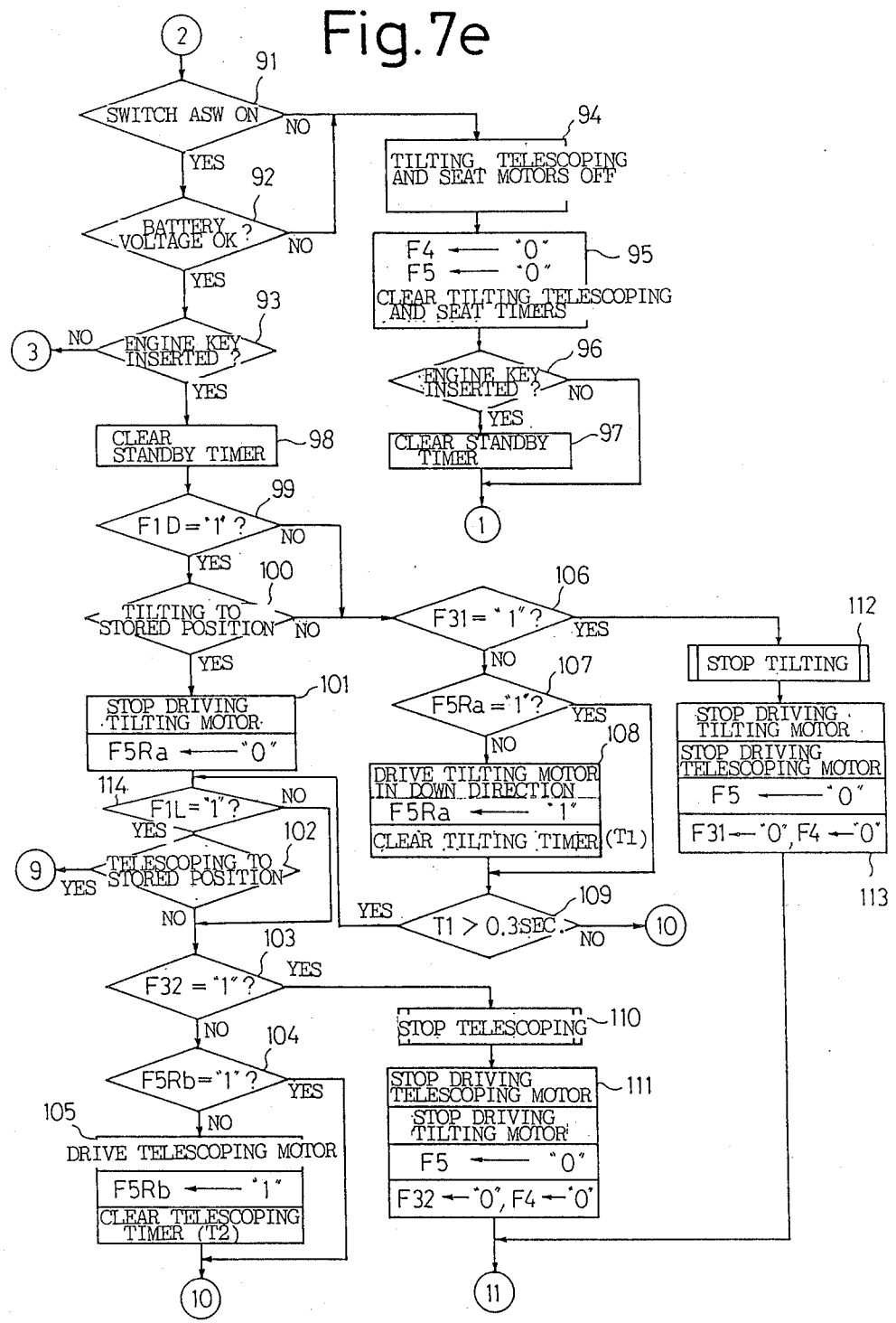
Figure 7F:
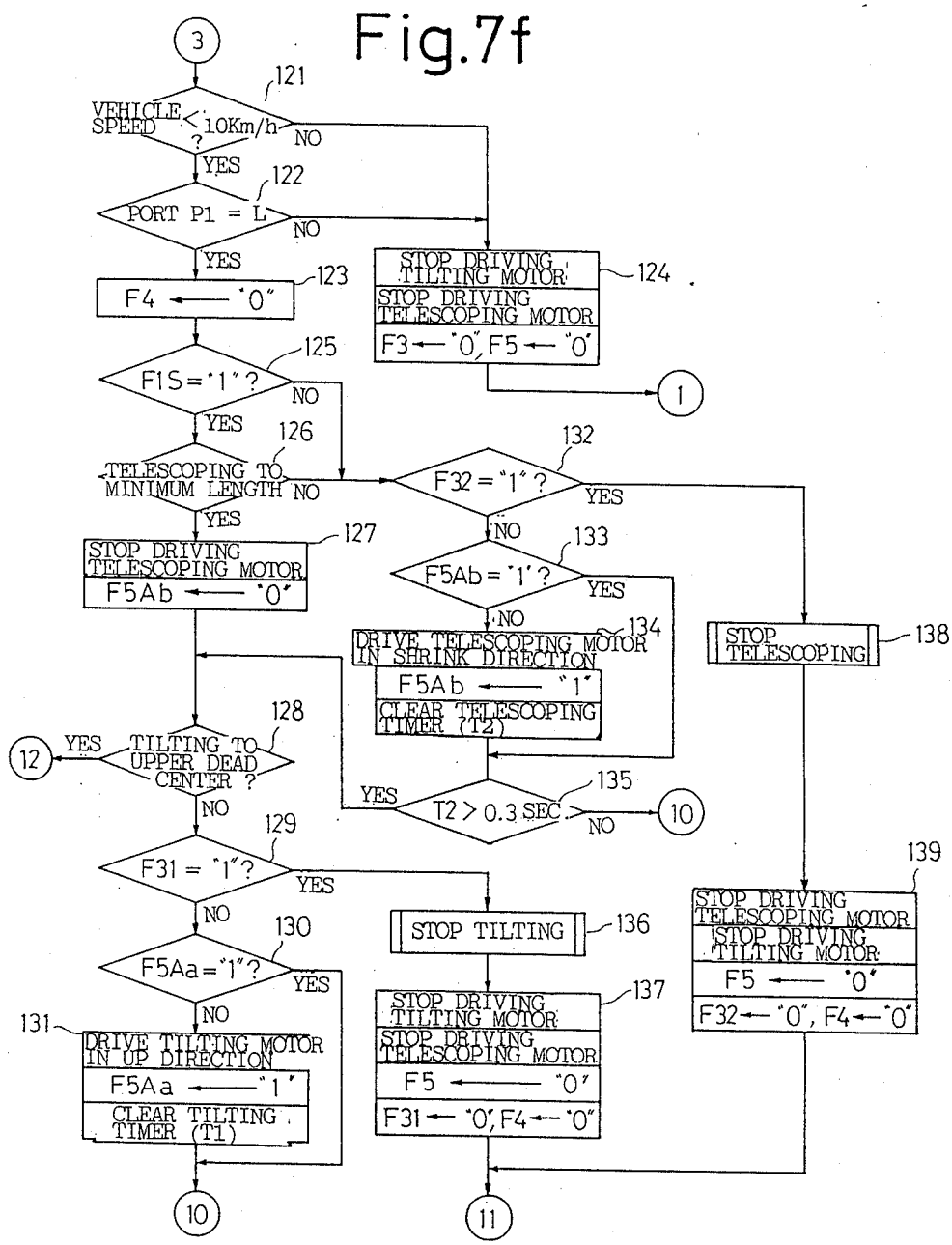
Figure 7G:
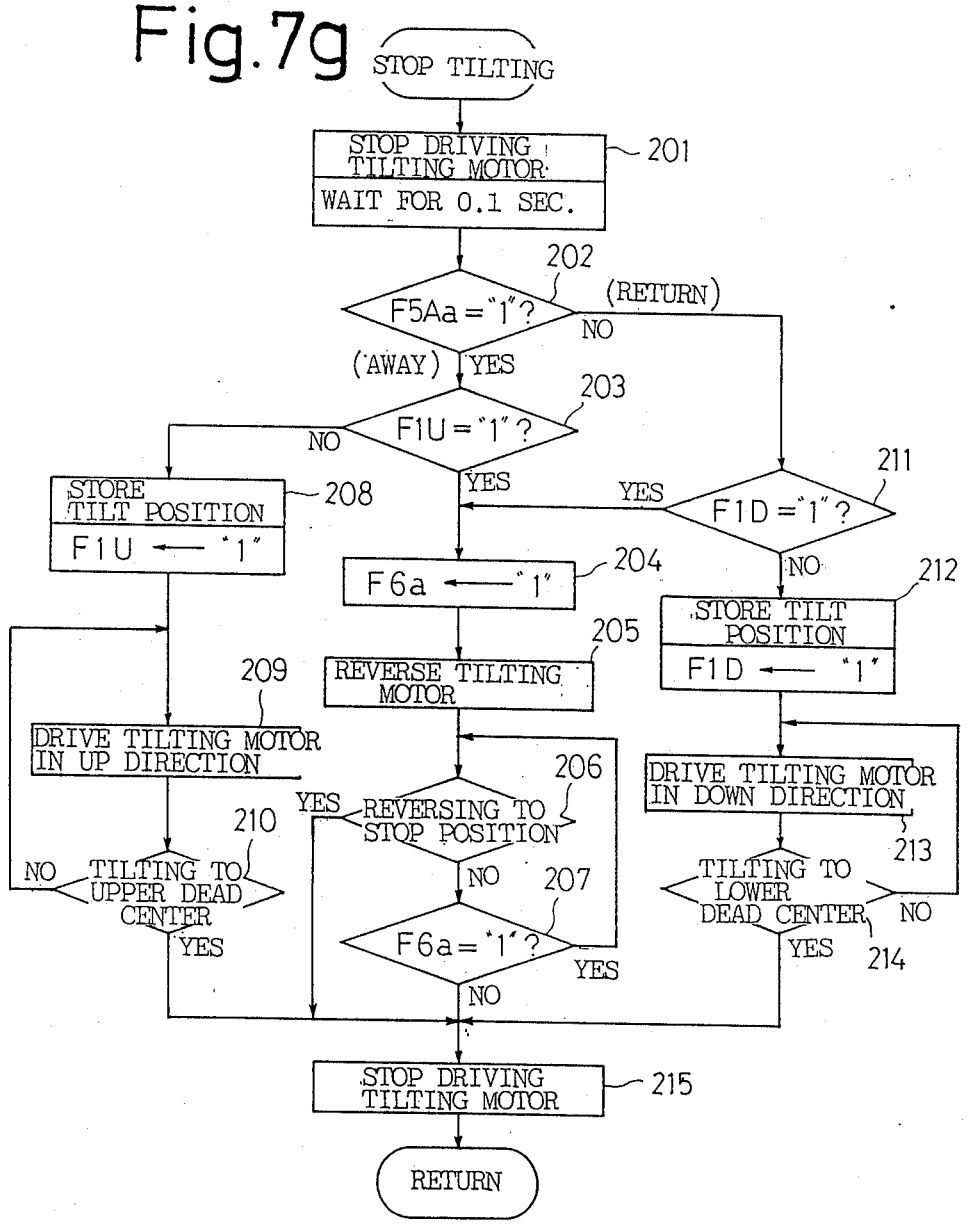
Figure 7H:
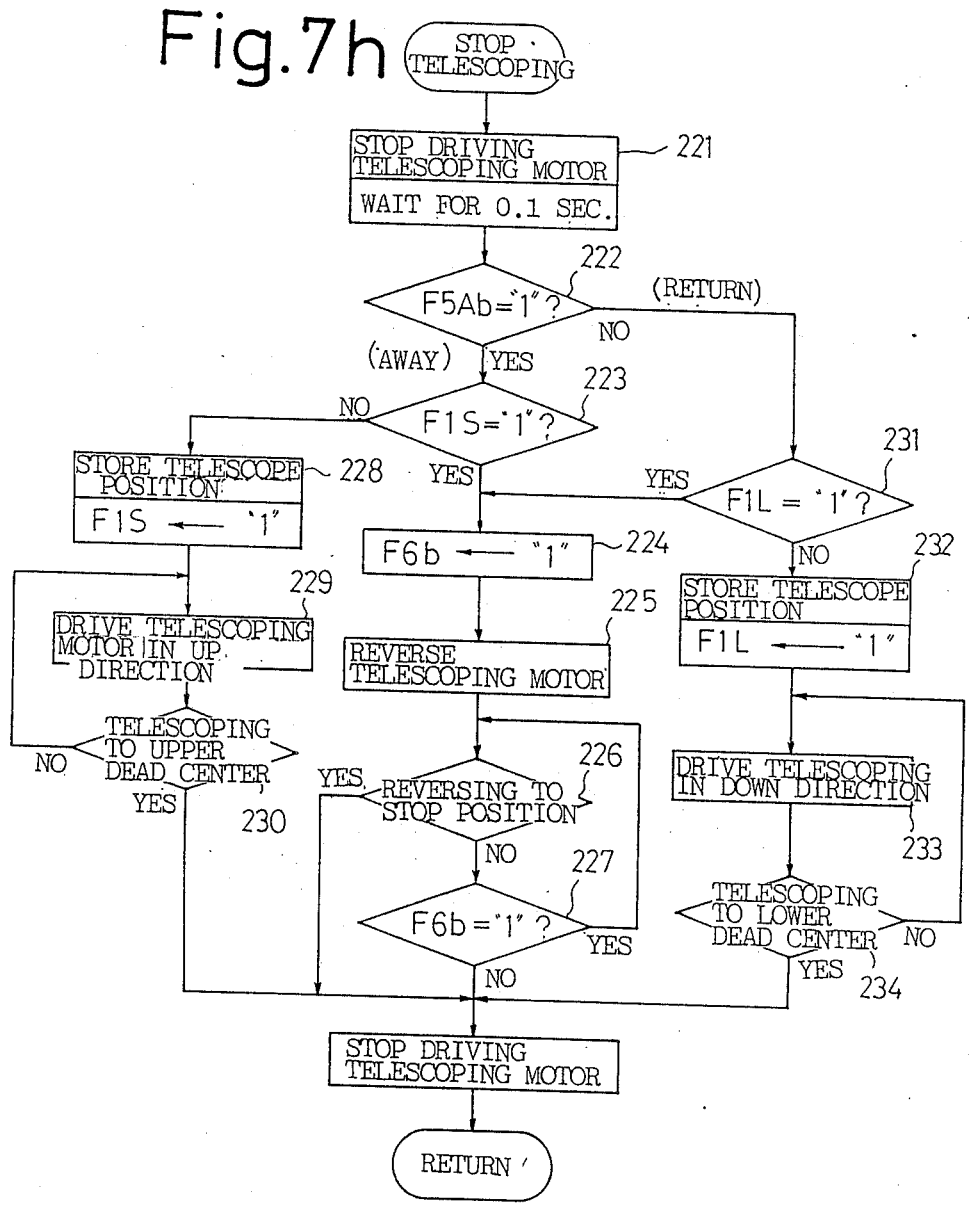
Figure 7I:
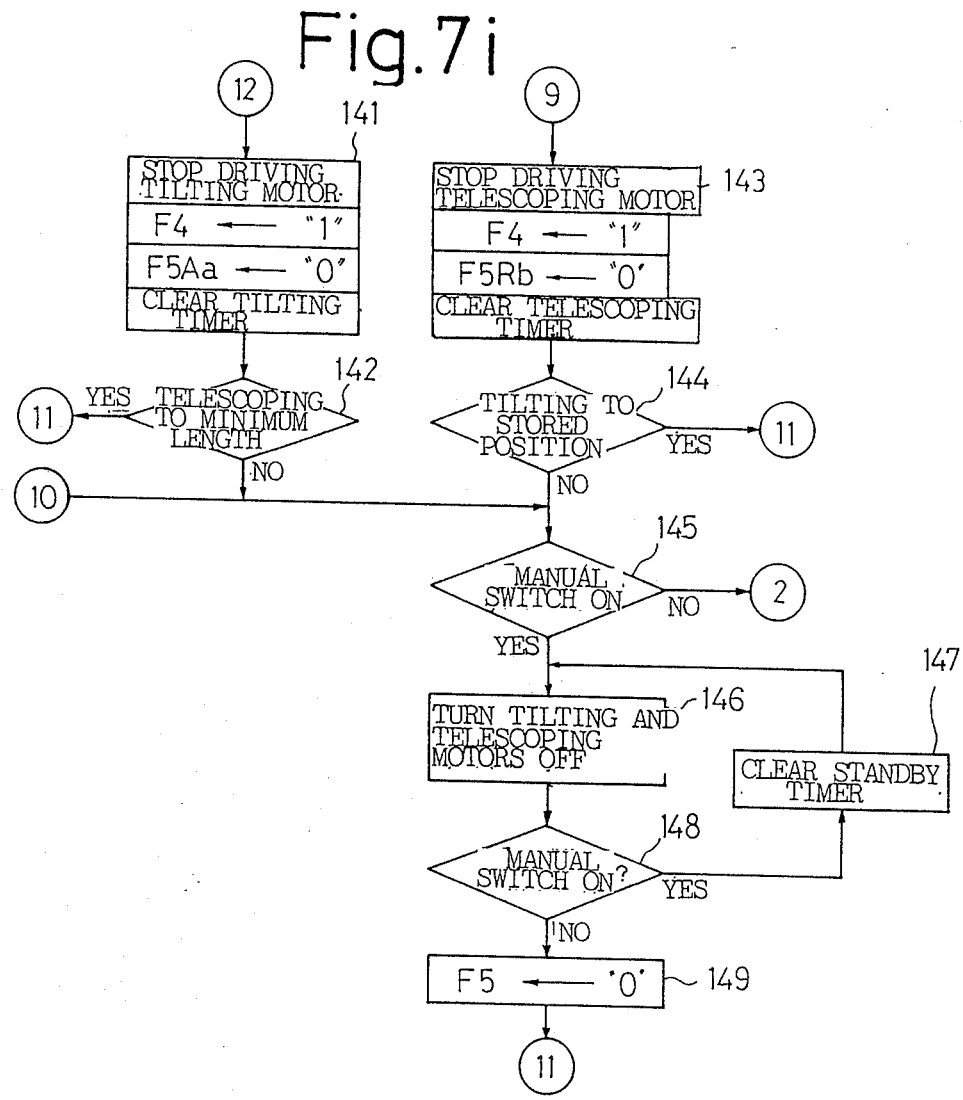

Once the limit position is stored by either the manual attitude control or the automatic attitude control, the program then proceeds through steps 98-99-100 in FIG. 7e, and the drive ceases when the tilting mechanism reaches the stored position for the normal driving operation which it assumed before the retracting operation has taken place. Since the limit position preset flag F1L is set to "1", the program proceeds through steps 109-114-102 where it is examined whether the telescopic mechanism assumes a stored position for the driving operation which it assumed before the retracting operation takes place. If the driving attitude is reached, the telescopic mechanism ceases to be driven. Thus, the tilting mechanism and the telescopic mechanism reach their respective limit positions during the return operation in order to establish these limit positions, only once immediately after the power has been turned on. When both the tilting mechanism and the telescopic mechanism reach their stored attitude, the return operation for the steering wheel is completed.

In this embodiment, the operation to establish an attitude automatically depends on the decision rendered in respect of the key switch KSW which indicates whether or not the engine key 2 is inserted into the key cylinder. Accordingly, if the engine key 2 is inserted into the key cylinder to start the operation to establish a desired attitude automatically, and is then turned to turn the ignition switch on before such operation is completed, the switch KSW cannot be turned off, thus avoiding that the operation to establish a desired attitude automatically be interrupted in the course of such operation in response to an operation of the engine key.

Figure 7J:
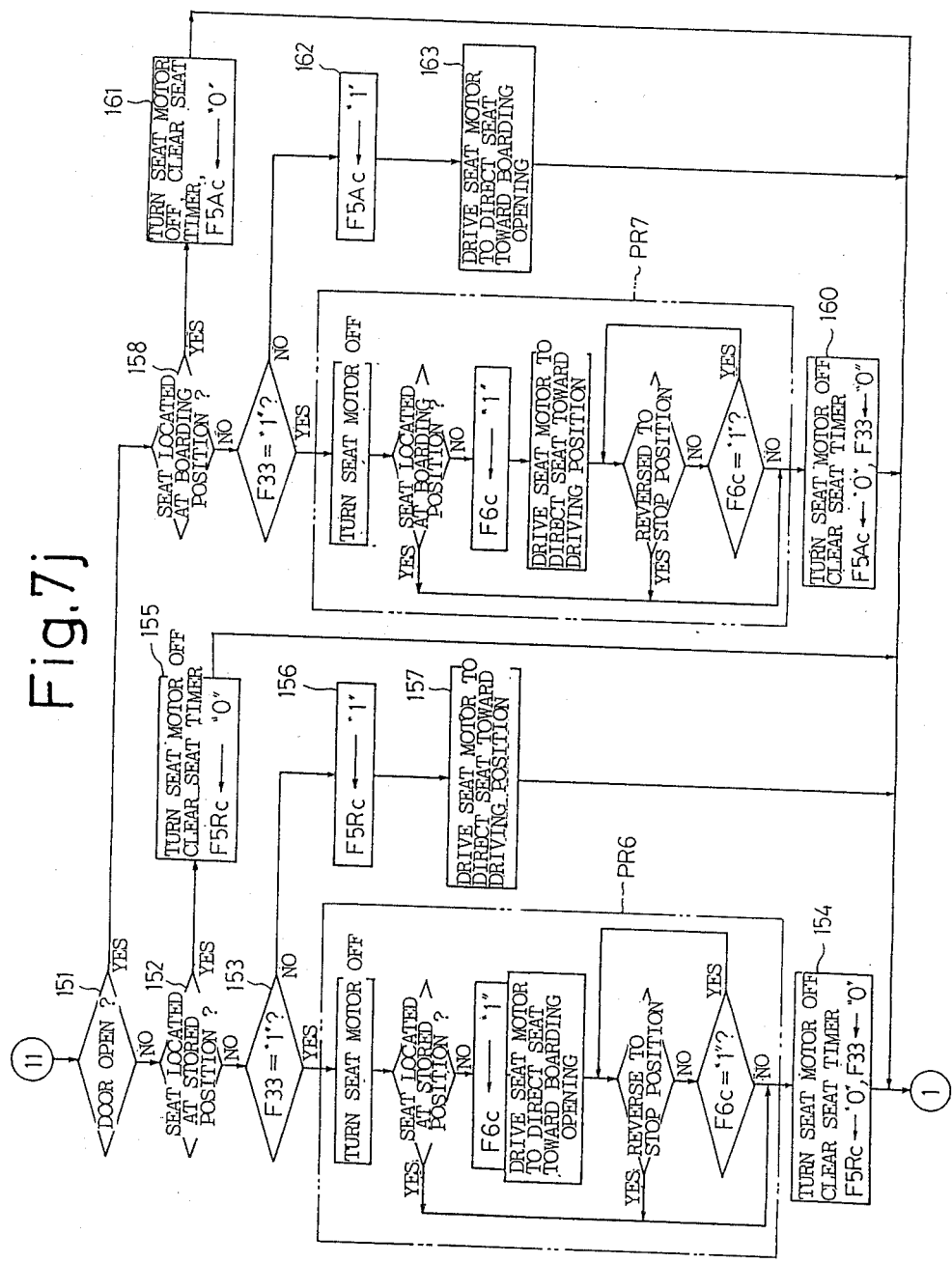
Figure 7K:
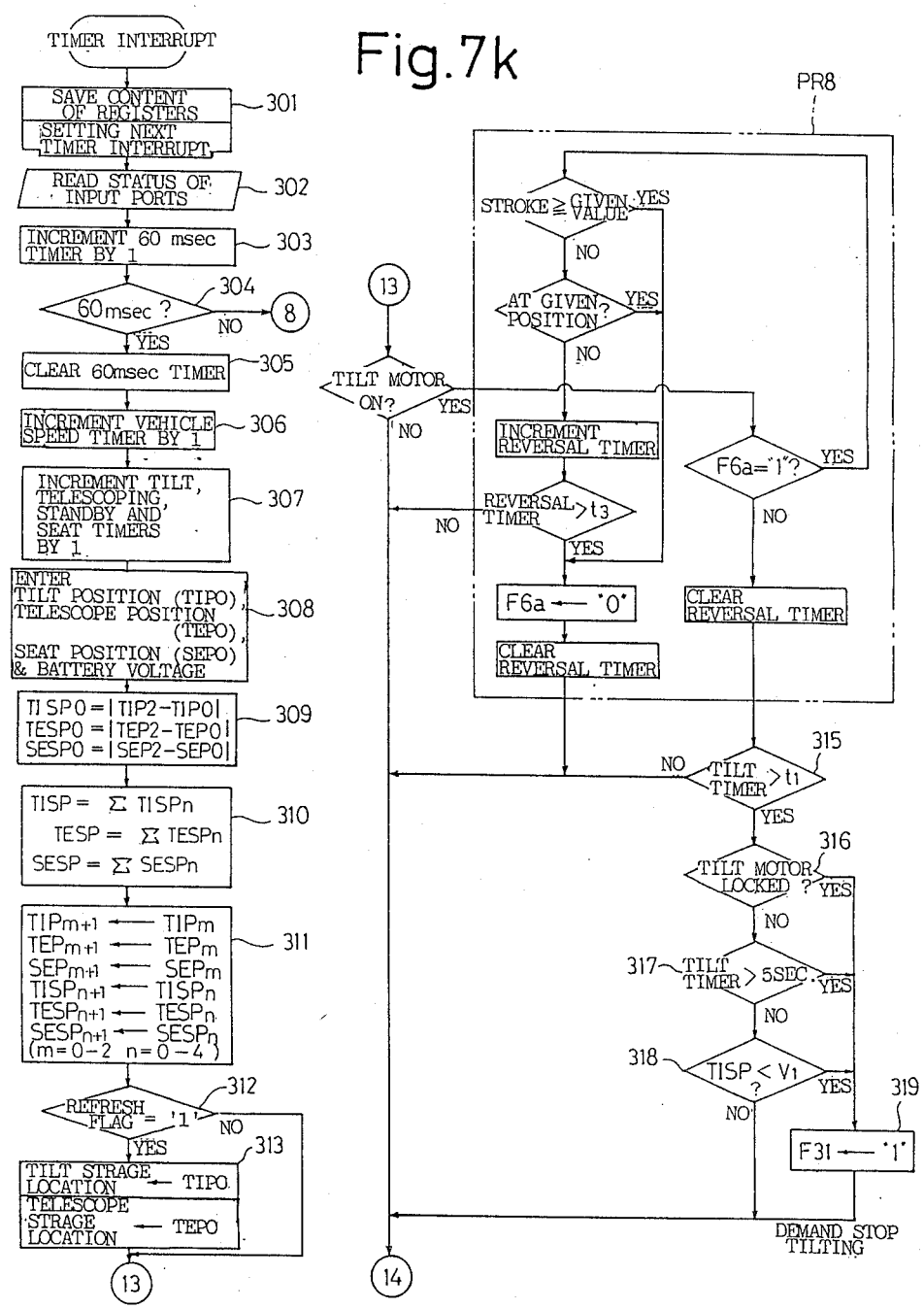
Figure 71:
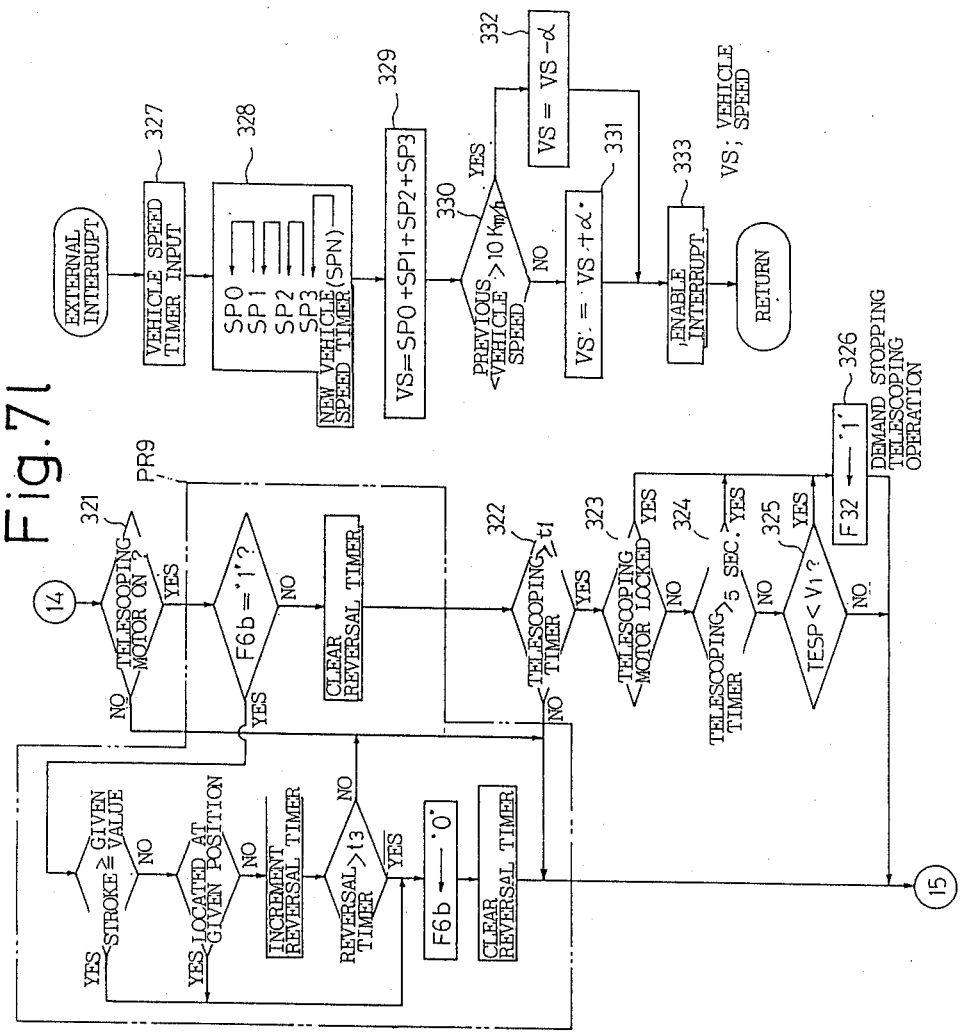
Figure 7M:
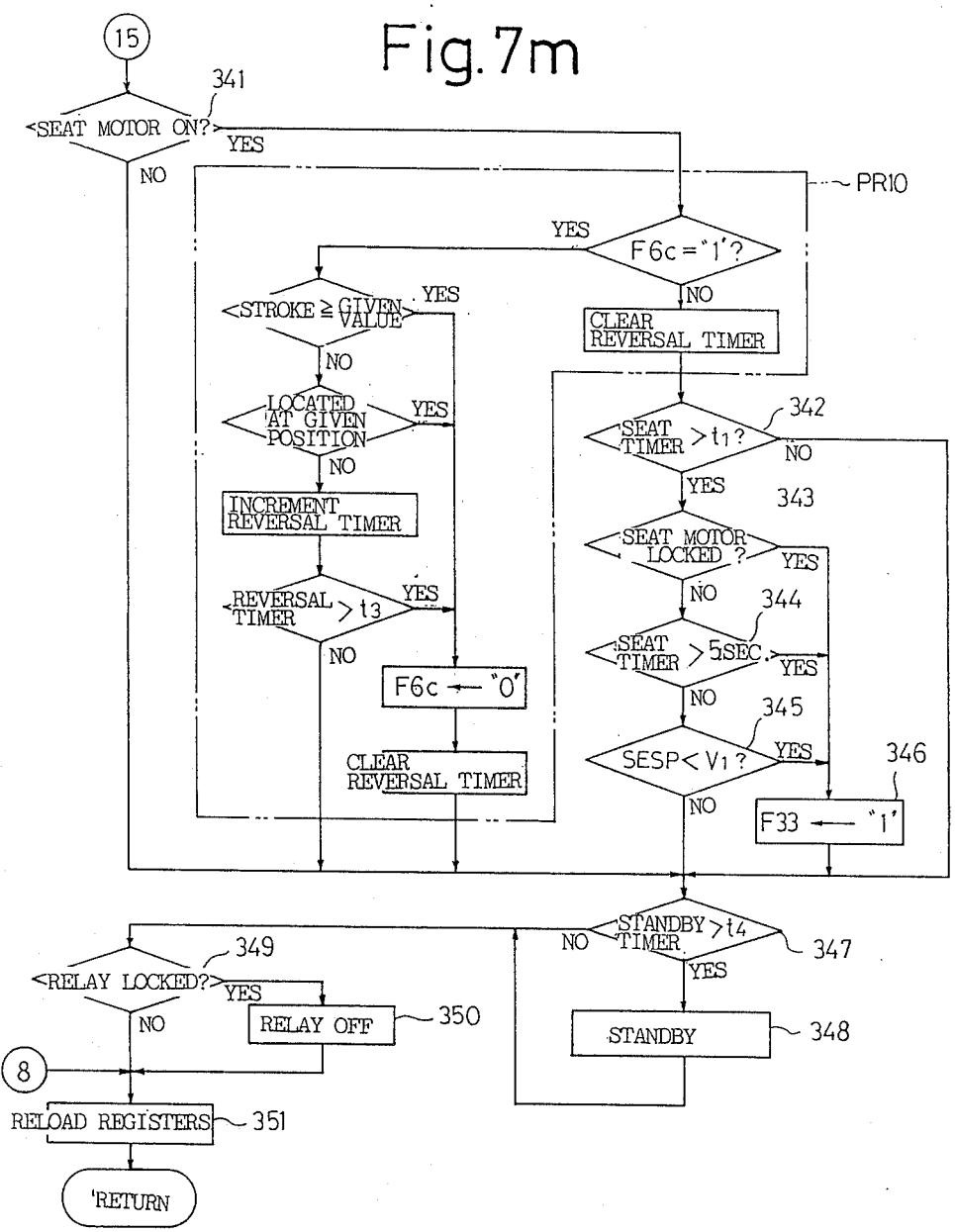

Referring to FIG. 7j, the seat attitude control will be described. The status of the door switch DSW is initially examined. If a door open condition is detected, the seat is located to its attitude which allows the driver to get on or off the vehicle. Initially, the away flag F5Ac is set to "1", the seat motor M1 is driven in a direction to orient the seat toward the door opening at step 162. Monitoring the seat attitude, when it reaches a desired attitude, the program then proceeds to step 161 where the seat motor M1 is turned off, the seat timer is cleared and the seat away flag F5Ac is cleared to "0".

If an overload condition is detected during the time the seat is being driven, the seat stop flag F33 is set to "1". In this instance, the program proceeds to step PR7 where the seat motor M1 is turned off, and in a similar manner as with other mechanisms, the reversal flag F6c is set to "1", thus allowing the seat motor M1 to be driven in the reverse direction. When the reversal flag assumes "0", the motor M1 is deenergized.

If a closed (not fully closed) door condition is detected, a driving condition is determined to be prevailing, and the program proceeds to step 156 where the seat return flag F5Rc is set to "1", and the seat motor M1 is driven in a direction to direct the seat toward the driving position. When the seat position is aligned with the stored attitude or the driving position, the seat motor M1 is turned off, the seat timer is cleared and the seat return flag F5Rc is cleared to "0" at step 155. If an overload condition is detected during the time the seat attitude is being returned to its normal position, the seat motor M1 is driven for rotation in the reverse direction, generally in the similar manner as with other attitude control operations, and when a given condition is satisfied, the motor M1 is deenergized.

In the embodiment described above, the operation to establish an attitude automatically (both away and return operation) is started depending on the vehicle speed, the parking brake and the presence or absence of the engine key as predetermined. However, various other parameters may be chosen. Modifications of the described embodiments in which these parameters are changed are shown in FIGS. 11, 12, 13, 14, 15 and 16 where part of the processing operation illustrated in FIG. 7e of the described embodiment is modified while the remainder is left unchanged.

Figure 11:
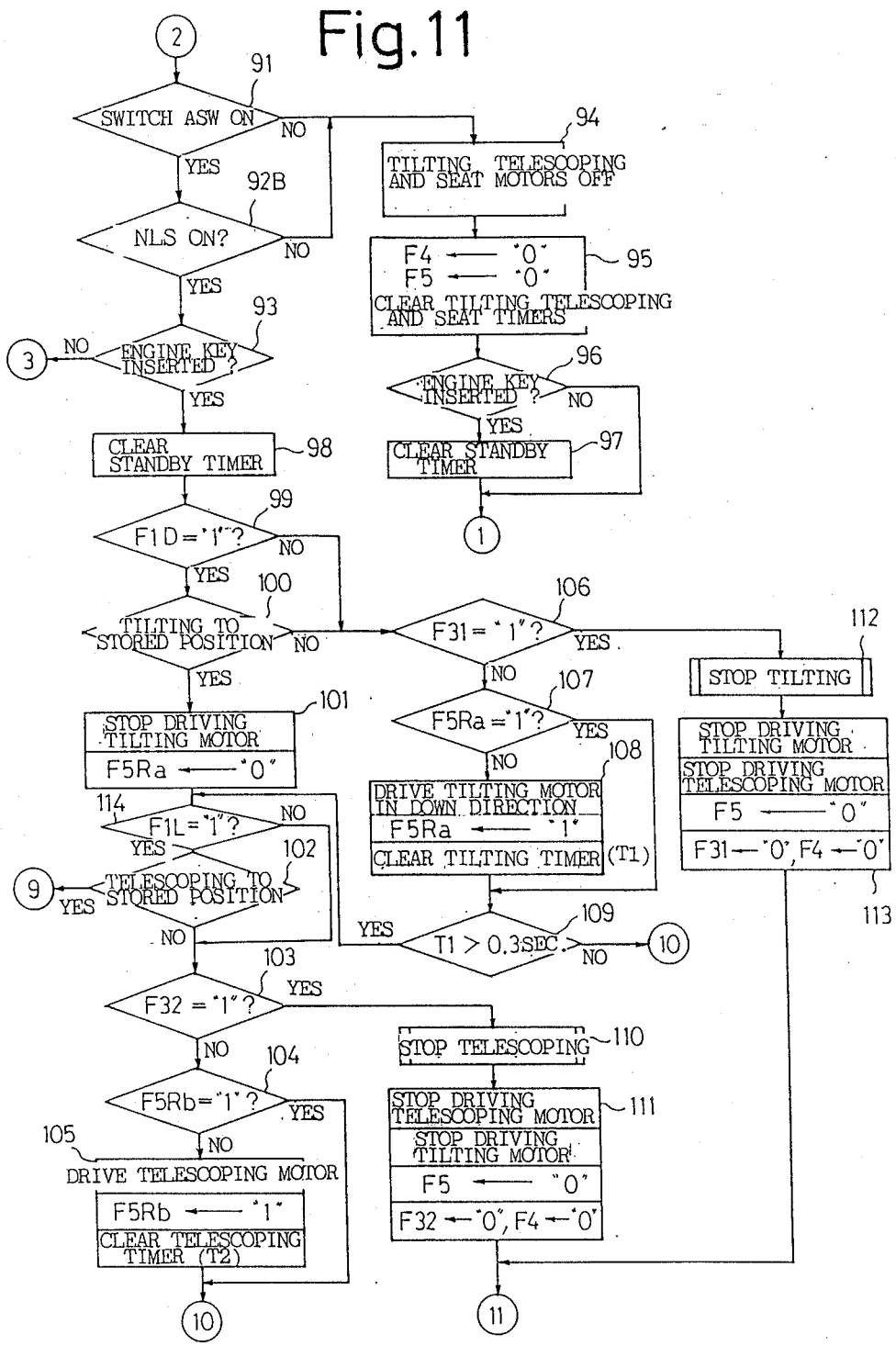
FIGS. 11, 12, 13, 14, 15 and 16 are a series of flowcharts representing the operation of a modification of the invention.

In the modification of FIG. 11, the attitude of the steering wheel (both the tilting and telescoping mechanisms) is automatically established only when the neutral switch NLS of the automatic transmission is on, performing the return or the away operation depending on the presence or absence of the engine key 2.

Figure 12:
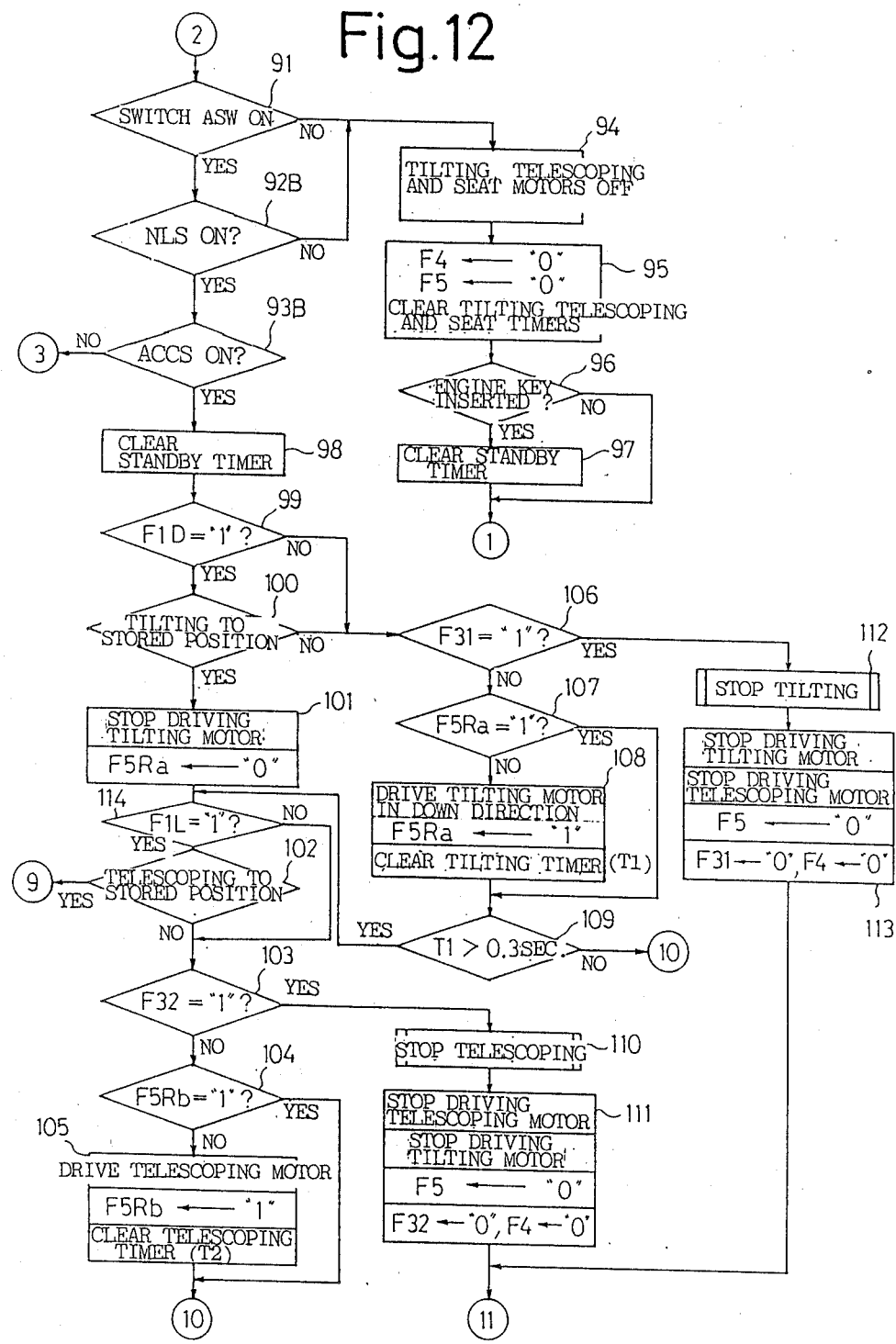

In the modification of FIG. 12, the automatic attitude control of the steering wheel is initiated only when the neutral switch NLS is on, performing the away or the return operation depending on the off/on condition of the accessory switch ACCS.

Figure 13:
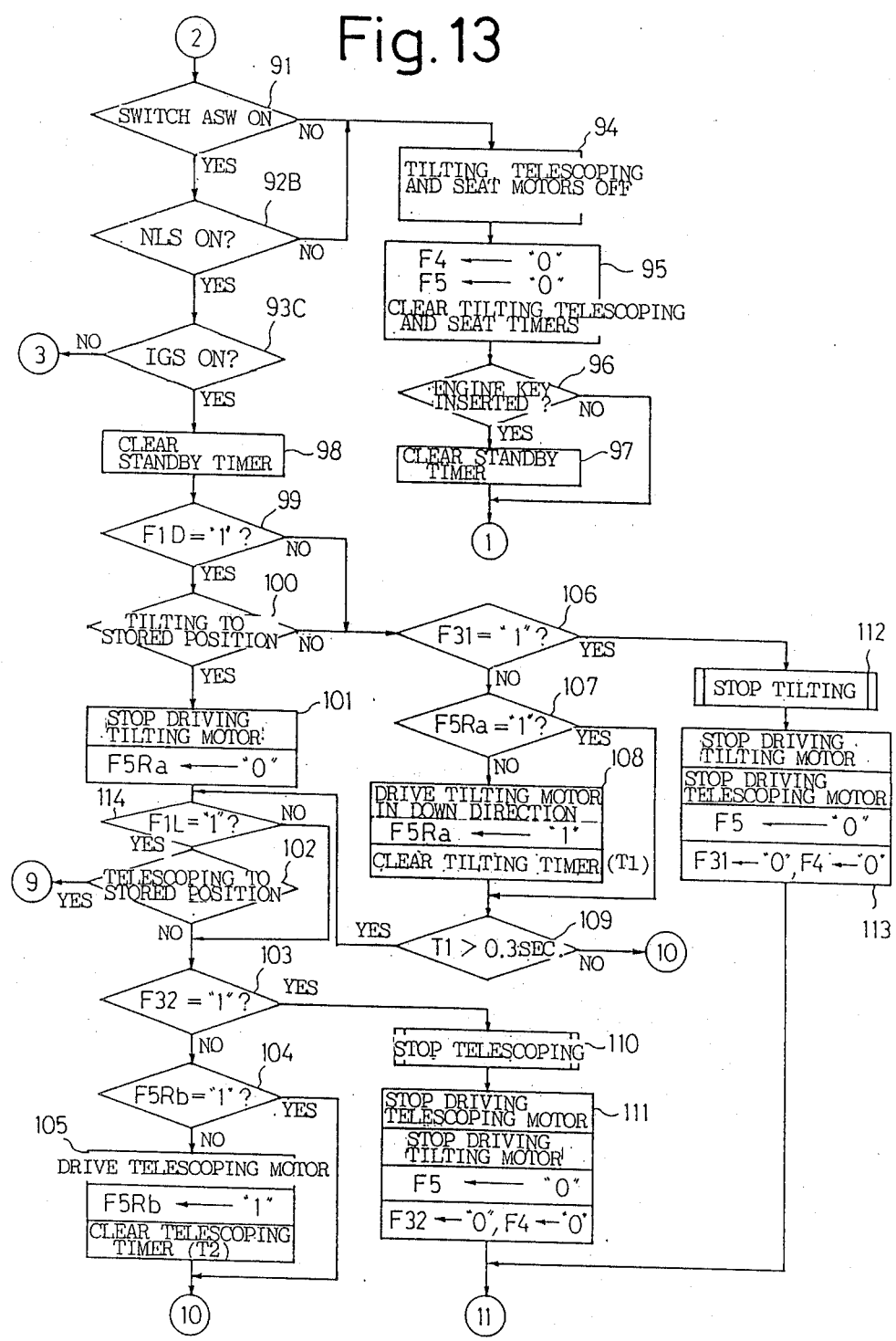

In the modification of FIG. 13, the automatic attitude control of the steering wheel is initiated only when the neutral switch NLS is on, performing the away or the return operation depending on the off/on condition of the ignition switch IGS.

Figure 14:
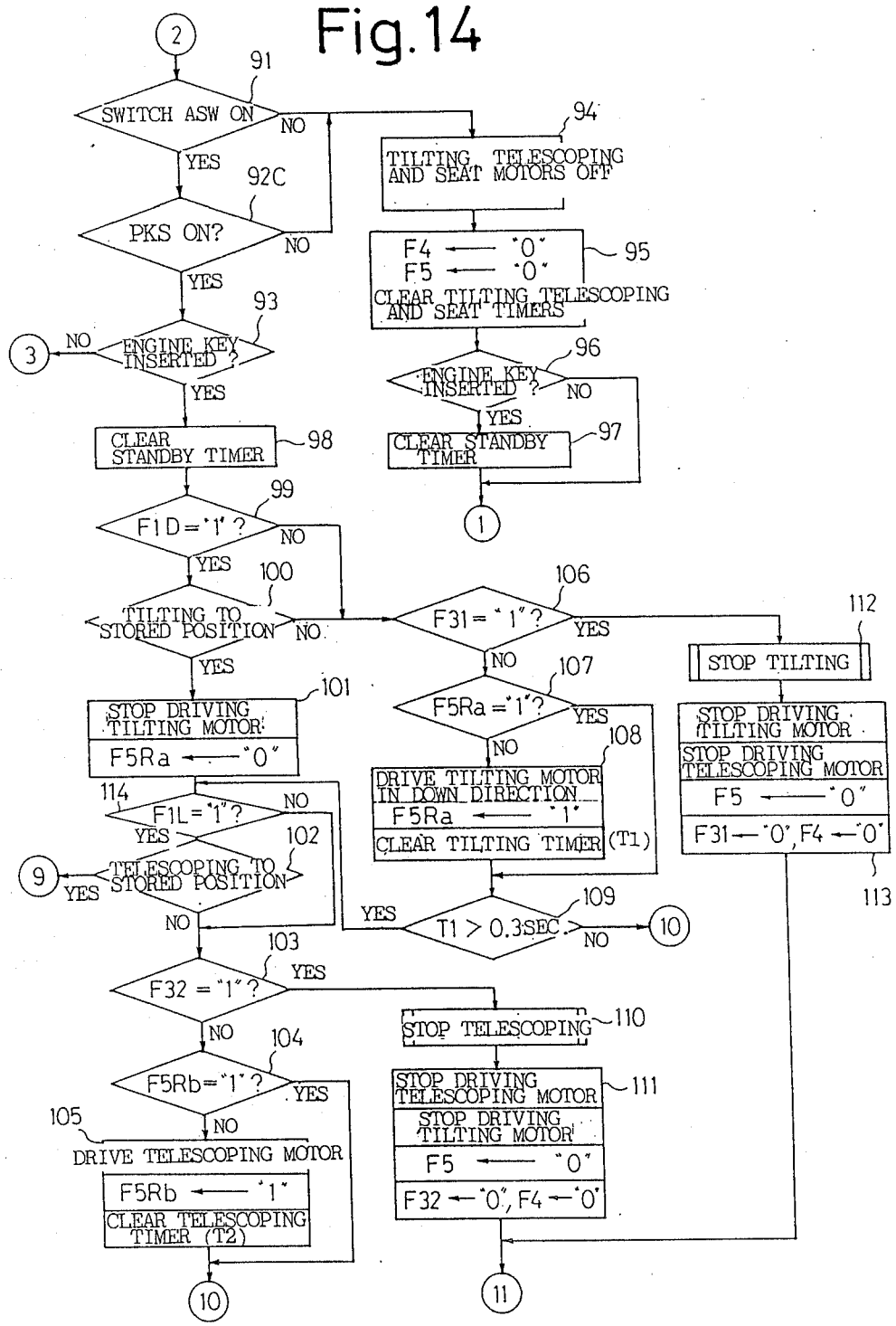

In the modification of FIG. 14, the automatic attitude control of the steering wheel is initiated only when the parking position switch PKS of the automatic transmission is on, performing the return or the away operation depending on the presence or absence of the engine key.

Figure 15:
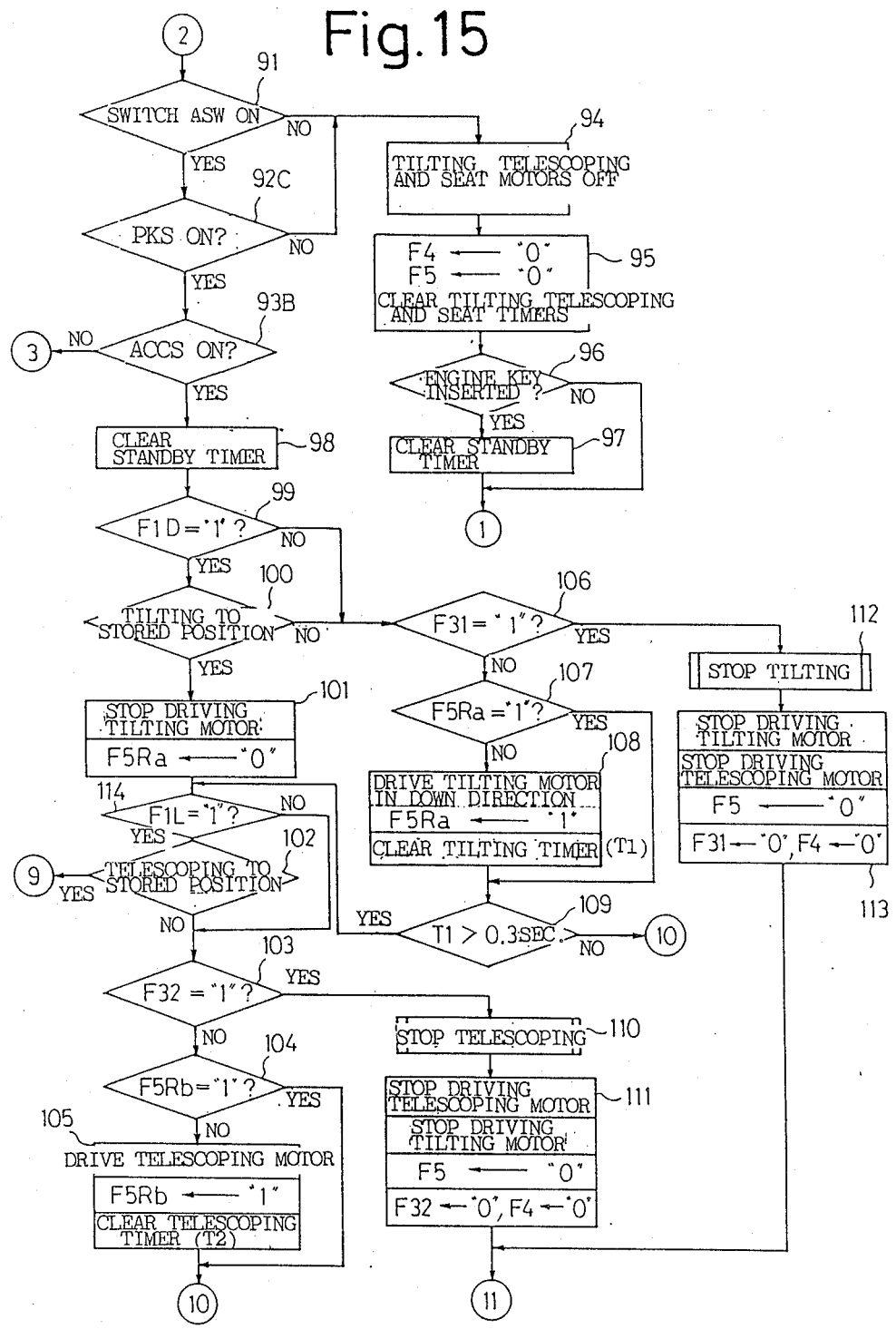

In the modification of FIG. 15, the automatic attitude control of the steering wheel is initiated only when the parking position switch PKS is on, performing the away or the return operation depending on the off/on condition of the accessory switch ACCS.

Figure 16:
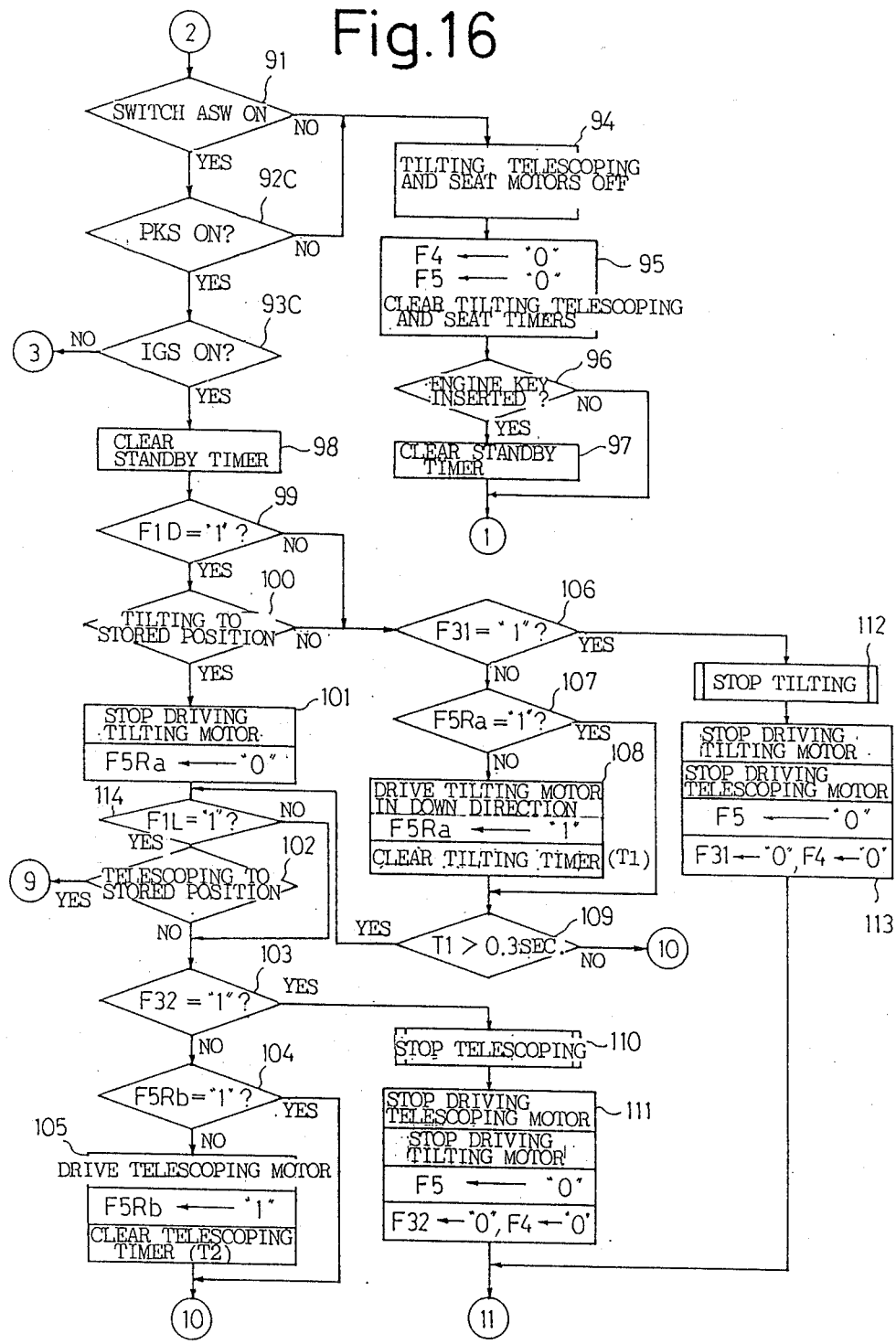

Finally, in the modification of FIG. 16, the automatic attitude control of the steering wheel is initiated only when the parking position switch PKS is on, performing the away or the return operation depending on the off/on condition of the ignition switch IGS.

Figure 10A:
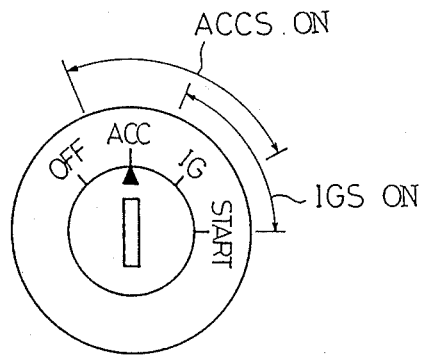
FIG. 10a is a front view of a key cylinder and an engine key.
Figure 10B:
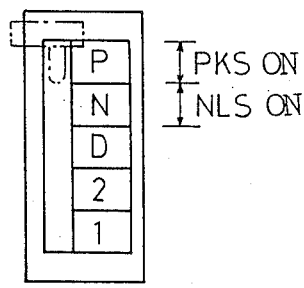
FIG. 10b is a plan view of an operating panel of an automatic transmission.

FIG. 10a shows the relationship between various positions of the engine key within the key cylinder and on/off condition of the respective switches, and FIG. 10b shows the relationship between the shift lever position and the on/off condition of the various switches. It will be understood that the described embodiments have respective unique features.

As described, in accordance with the invention, using the actual or mechanical limit position as a reference, an imaginary limit position which is slightly short of the mechanical limit position is automatically determined and stored. After the storage, the attitude control is stopped when the imaginary limit position is reached. In this manner, there is no need to provide sensors which are used to detect the limit positions while preventing a repeated occurrence of excessive stresses caused to the mechanism as a result of the mechanical collision, assuring an increased useful life of the apparatus. In addition, since the sensors, are dispensed with, no adjustment of such sensors is required.

With the described embodiment, when the mechanism reaches a limit position, the attitude of the mechanism is moved back through a small stroke, interrupting the drive to the mechanism after the stresses which may have been caused by the mechanical collision have been relieved. Accordingly, if a mechanical collision of the mechanism should occur, the mechanism does not continue to be subject to excessive stresses over an increased length of time. Accordingly, if the drive is stopped in response to the detection of the presence or absence of a collision, the lifetime of the apparatus can be increased.

Also, with the described arrangement, immediately after the manual attitude control is initiated, the drive is temporarily stopped. Accordingly, if the drive occurs at a high rate, the attitude is controlled through a predetermined stroke, which is chosen small, in response to an on/off operation of the switch. Accordingly, by repeating the turn-on and -off of the switch, a fine adjustment or an accurate positioning is assured. This also means that if the drive unit is designed to operate at a high rate, an attitude control through an increased stroke can be completed within a reduced length of time without degrading the fine adjustment capability.

Also, in the embodiment described, drive means of one mechanism is energized after the rush current associated with the initial energization of drive means (electric motor) of another mechanism has no significant influence. Accordingly, if a plurality of mechanisms are driven virtually simultaneously, an overlapping of rush currents is avoided as is a malfunctioning which may be caused by a voltage drop. As described, a plurality of mechanisms are driven virtually simultaneously, thus reducing the length of time which is required for the attitude control.

What is claimed is:

1. Apparatus for controlling the attitude of vehicle mounted device comprising
    an onboard attitude controlling mechanism which controls the attitude of a vehicle mounted device such as a steering wheel, a seat or the like;
    an electric drive unit for driving the onboard attitude controlling mechanism;
    means for detecting the attitude of a vehicle mounted device;
    at least one switch means commands a control over the attitude of a vehicle mounted device;
    and electronic control means for energizing the electric drive unit to control the attitude of a vehicle mounted device in response to the on condition of the switch means which is construed as a command to control the attitude, and the control means including storage means for storing a limit position with said control means being responsive to the presence or absence of a stored limit position, the control means having means for detecting an abnormality in the operation of said electric drive unit in the event of absence of a stored limit position to thereby determine and store as a limit position an attitude which is driven back through a given stroke as referenced to the prevailing attitude of the vehicle mounted device when the abnormality is detected, the control means deenergizing the electric drive unit automatically when the vehicle mounted device reaches a stored limit position in the event of the presence of the storage.

2. An apparatus according to claim 1 in which in response to a command to re-establish a limit position, the electronic control means causes the attitude of the vehicle mounted device to be controlled beyond the stored limit position and determines the presence or absence of an abnormality, and if an abnormality is detected, the control means determines and re-stores as a limit position an attitude which is driven back through a given stroke as referenced to the prevailing attitude of the vehicle mounted device when abnormality is detected.

3. An apparatus according to claim 2 in which the electronic control means includes a manual attitude controlling switch and in which when the switch changes from its off to its on condition after it has been changed from its on to its off condition at the stored limit position, the control means determines such change of the switch as the command to re-establish the limit position.

4. An apparatus according to claim 1 in which the switch means includes detecting switch means having different status between when a driver gets on and off the vehicle, and wherein the electronic control means responds to the presence or absence of a first stored limit position, the control means responding to a signal from the detecting switch means which indicates a driver getting off the vehicle by driving the vehicle mounted device in a given direction until an abnormality is detected to thereby store the first limit position in the absence of a previously stored limit position, and by driving the vehicle mounted device until the first limit position is reached in the presence of a stored limit position, the electronic control means also responding to the presence or absence of a second stored limit position which is in the opposite direction from the first limit position and responding to a signal from the detecting switch means which indicates a driver getting on the vehicle by returning the attitude of the vehicle mounted device to a position which it assumed before a retracting operation takes place in the presence of a stored limit position and by driving the vehicle mounted device in a given direction until an abnormality is detected to thereby store the second limit position in the absence of a stored limit position.

5. An apparatus according to claim 1 in which the electronic control means determines the presence or absence of an abnormality by monitoring the rate of change in the attitude detected by the attitude detecting means.

6. An apparatus according to claim 1 in which the electronic control means samples an output from the attitude detecting means at a given time interval and determines the occurrence of an abnormality when the magnitude of a change in the attitude sampled is less than a given value.

7. An apparatus for controlling the attitude of vehicle mounted device comprising
    an onboard attitude controlling mechanism which controls the attitude of a vehicle mounted device such as a steering wheel, a seat or the like;
    an electric unit drive for driving the onboard attitude controlling mechanism;
    attitude detecting means for detecting the attitude of the vehicle mounted device;
    at least one switch means for commanding a control over the attitude of the vehicle mounted device;

an electronic control means for energizing the electric drive unit to control the attitude of the vehicle mounted device in response to an on condition of the switch means which is construed as a command to control the attitude, and for detecting the presence or absence of an abnormality, the control means having means for automatically reversing the electric drive unit whereby in the event an abnormality is detected, the drive unit will automatically reverse the direction in which the attitude is controlled and deenergize the electric drive unit after the abnormality of the vehicle mounted device has been removed subsequent to the reversal.

8. An apparatus according to claim 7 in which when an abnormality is detected, the electronic control means determines and stores as a limit position an attitude which has been driven back through a given stroke as referenced to the prevailing attitude of the vehicle mounted device when the abnormality is detected, the control means subsequently limiting the movement of the vehicle mounted device within an extent determined by the stored limit position.

9. An apparatus according to claim 7 in which when an abnormality is detected, the electronic control means reverses the direction in which the attitude is controlled, the control means ceasing to energize the electric drive unit when the attitude detected by the attitude detecting means has reached a predetermined attitude.

10. An apparatus according to claim 7 in which when an abnormality is detected, the electronic control means reverses the direction in which the attitude is controlled, the control means counting the time duration of the reverse drive until a given count is reached, whereupon it inhibits the energization of the electric drive unit.

11. An apparatus according to claim 7 in which the electronic control means monitors an attitude detected by the attitude detecting means as long as the electric drive unit is energized, and determines the occurrence of an abnormality whenever a rate of change in the attitude detected is less than a given value.

12. An apparatus according to claim 11 in which the electronic control means samples an output from the attitude detecting means at a give time interval, and determines the occurrence of an abnormality whenever a change in the attitude samples is less than a given value.

13. An apparatus for controlling the attitude of a vehicle mounted device comprising
    a first and a second onboard attitude controlling mechanism which control the attitude of vehicle mounted devices such as a steering wheel, a seat or the like;
    a first and a second electric drive unit for driving the first and second onboard attitude controlling mechanism, respectively;
    attitude detecting means for detecting the attitude of the vehicle mounted device;
    at least one switch means for commanding a control over the attitude of the vehicle mounted device;
    and electronic control means for energizing one of the first or second electric drive units in response to the on condition of the switch means which is construed as a command to control the attitude, and for energizing the other of the first and the second electric drive unit after the transient current associated with said one of the electric drive units which occurs when initiating its energization has subsided sufficiently, thus driving the first and the second onboard attitude control mechanism substantially simultaneously, wherein the switch means comprises a switch which produces commands to establish a retracted attitude and a driving attitude, the first onboard attitude control mechanism comprises a tilt angle controlling mechanism for a steering wheel, and the second onboard attitude control mechanism comprises an axial position controlling mechanism of the steering wheel, and wherein the electronic control means initiaklly energizes the second electric drive unit, followed by the energization of the first electric drive unit in response to a command to establish a retracted attitude from the switch means, and energizes the first electric drive unit initially, followed by the energization of the second electric drive unit in response to a command to establish the driving attitude from the switch means.

14. An apparatus according to claim 13 in which the electronic control means energizes one of the first or second electric drive units in response to a command to control the attitude from the switch means, and energizes the other of the first and the second electric drive unit after a given time interval has passed thereafter, thus driving the first and the second onboard attitude control mechanism substantially simultaneously.

15. An apparatus according to claim 13 in which the switch means comprises a first switch which produces a signal indicating whether or not the shift position of an automatic transmission is at its neutral position, and a second switch which produces a signal representing the presence or absence of an engine key inserted into a key cylinder, and wherein the electronic control means brings a vehicle mounted device to a given retracted attitude when the shift position of the automatic transmission is at its neutral position and the engine key is disengaged from the key cylinder, and brings a vehicle mounted device to a given driving attitude when the shift position of the automatic transmission is at its neutral position and the engine key is inserted into the key cylinder.

16. An apparatus according to claim 13 in which the switch means comprises a first switch which produces a signal indicating whether the shift position of an automatic transmission is at its parking position, and a second switch which produces a signal representing the presence or absence of an engine key inserted into a key cylinder, and wherein the electronic control means brings a vehicle mounted device to a given retracted attitude when the shift position of the automatic transmission is at its parking position and the engine key is disengaged from the key cylinder, and brings a vehicle mounted device to a given driving attitude when the shift position of the automatic transmission is at its parking position and the engine key is inserted into the key cylinder.

17. An apparatus according to claim 13 in which the switch means comprises a first switch which produces a signal indicating whether the shift position of an automatic transmission is at its neutral position, and a second switch which produces a signal representing whether an engine key is in a position to turn an accessory on, and wherein the electronic control means brings a vehicle mounted device to a given retracted attitude when the shift position of the automatic transmission is at its neutral position and the engine key is not in an accessory on position, and brings a vehicle mounted device to a given driving attitude when the shift position of the automatic transmission is at its neutral position and the engine key is in an accessory on position.

18. An apparatus according to claim 13 in which the switch means comprises a first switch which produces a signal indicating whether the shift position of an automatic transmission is at its parking position, and a second switch which produces a signal representing whether an engine key is in an accessory on position, and wherein the electronic control means brings a vehicle mounted device to a given retracted attitude when the shift position of the automatic transmission is at its parking position and the engine key is not in an accessory on position, and brings a vehicle mounted device to a given driving attitude when the shift position of the automatic transmission is at its parking position and the engine key is in an accessory on position to turn the accessory on.

19. An apparatus according to claim 13 in which the switch means comprises a first switch which produces a signal indicating whether the shift position of an automatic transmission is at its neutral position, and a second switch which produces a signal representing whether an engine key is in a position to turn an ignition key on, and wherein the electronic control means brings a vehicle mounted device to a given retracted attitude when the shift position of the automatic transmission is at its neutral position and the engine key is not in an ignition on position, and brings a vehicle mounted device to a given driving attitude when the shift position of the automatic transmission is at its neutral position and the engine key is in an ignition on position.

20. An apparatus according to claim 13 in which the switch means comprises a first switch which produces a signal indicating whether the shift position of an automatic transmission is at its parking position, and a second switch which produces a signal representing whether an engine key is in an ignition on, position and wherein the electronic control means brings a vehicle mounted device to a given retracted attitude when the shift position of the automatic transmission is at its parking position and the engine key is not in an ignition on position, and brings a vehicle mounted device to a given driving attitude when the shift position of the automatic transmission is at its parking position and the ignition key is in an ignition on position.

* * * * *